United States Patent
Wang et al.

(10) Patent No.: US 12,452,196 B2
(45) Date of Patent: Oct. 21, 2025

(54) SYSTEM AND METHOD FOR DETERMINING A RESPONSE STRATEGY TO A SET OF MESSAGES

(71) Applicant: SHOPEE IP SINGAPORE PRIVATE LIMITED, Singapore (SG)

(72) Inventors: Rundong Wang, Singapore (SG); Zhongwen Xu, Singapore (SG); Shuicheng Yan, Singapore (SG)

(73) Assignee: SHOPEE IP SINGAPORE PRIVATE LIMITED, Singapore (SG)

( * ) Notice: Subject to any disclaimer, the term of this patent is extended or adjusted under 35 U.S.C. 154(b) by 37 days.

(21) Appl. No.: 18/417,342

(22) Filed: Jan. 19, 2024

(65) Prior Publication Data

US 2024/0259332 A1   Aug. 1, 2024

(30) Foreign Application Priority Data

Jan. 26, 2023  (SG) ............... 10202300214P
Jan. 4, 2024   (SG) ............... 10202400033T

(51) Int. Cl.
   *G06F 15/16*   (2006.01)
   *H04L 51/02*   (2022.01)
   *H04L 51/07*   (2022.01)
   *H04L 51/216*  (2022.01)

(52) U.S. Cl.
   CPC .............. *H04L 51/02* (2013.01); *H04L 51/07* (2022.05); *H04L 51/216* (2022.05)

(58) Field of Classification Search
   CPC ............................. H04L 51/02; H04L 51/216
   USPC .......................................................... 709/206
   See application file for complete search history.

(56) References Cited

U.S. PATENT DOCUMENTS

| | | | | |
|---|---|---|---|---|
| 8,825,848 | B1 * | 9/2014 | Dotan ................... | G06F 21/577 709/224 |
| 11,689,618 | B2 * | 6/2023 | Cintuglu ............. | H04L 67/1074 709/248 |
| 12,271,832 | B2 * | 4/2025 | Stumpe .................. | G06N 5/02 |
| 12,309,108 | B2 * | 5/2025 | Goenka .................. | H04L 51/02 |
| 2023/0037388 | A1 * | 2/2023 | Sakhinana .............. | G06N 3/08 |
| 2023/0275963 | A1 * | 8/2023 | Cintuglu ................ | H04L 67/12 709/248 |

* cited by examiner

Primary Examiner — Alicia Baturay
(74) Attorney, Agent, or Firm — Straylight LLP

(57) ABSTRACT

Systems, methods, and non-transitory computer-readable mediums are provided for an improved system for determining a response strategy to a set of messages received by at least one agent of a plurality of agents. For example, a system may be configured to obtain a set of messages received by at least one agent of a plurality of agents. Additionally, the system may be configured to categorize each message of the set of messages into an asynchronous category or a synchronous category. Moreover, the system may be configured to determine a significance parameter indicative of an importance of the received content parameter of each of at least two asynchronous messages. Further, the system may be configured to determine, for the at least one agent, a response signal related to the response strategy. In some examples, response signal may be determined based on the significance parameter.

20 Claims, 17 Drawing Sheets

SYSTEM AND METHOD FOR DETERMINING A RESPONSE STRATEGY TO A SET OF MESSAGES

CROSS REFERENCE TO RELATED APPLICATIONS

This patent application claims the benefit and priority of Provisional Singaporean Patent Application No. 10202300214P, filed with the Intellectual property Office of Singapore on Jan. 26, 2023, entitled "A SYSTEM AND METHOD FOR DETERMINING A RESPONSE STRATEGY TO A SET OF MESSAGES," and of Singaporean Patent Application No. 10202400033T, filed with the Intellectual property Office of Singapore on Jan. 4, 2024, entitled "A SYSTEM AND METHOD FOR DETERMINING A RESPONSE STRATEGY TO A SET OF MESSAGES," the contents of which are incorporated by reference in their entireties.

TECHNICAL FIELD

Various aspects of this disclosure relate to a system for determining a response strategy to a set of messages received by at least one agent of a plurality of agents, a control device for said system, and a method of operating the system for determining the response strategy.

BACKGROUND

The following discussion of the background art is intended to facilitate an understanding of the present disclosure only. It should be appreciated that the discussion is not an acknowledgement or admission that any of the material referred to was published, known or is part of the common general knowledge of the person skilled in the art in any jurisdiction as of the priority date of the disclosure.

Multi-agent reinforcement learning (MARL) is traditionally employed as a tool for complex robotic and strategic areas. It is, however, challenging to deploy MARL to solve cooperative tasks, mainly due to the partial observation of the agents, which leads to the agents' uncertainty and unawareness of the global state.

Conventional solutions developed to address communication problems in MARL mainly focus on designing effective communication models to improve the gains in communication but largely ignore the asynchronous communication issue that exists in MARL systems. In asynchronous communication, messages are not transmitted at regular intervals and agents communicate with each other with time delays, leading to inefficient and unsafe cooperation. For example, multiple agents need to communicate with each other about their location and intentions in the task of transferring multiple items in a warehouse. With an ever-changing physical distance between the sender and receiver, the agent would always receive out-of-time messages. Such delayed messages may indicate a wrong location, leading to wrong or even catastrophic responses.

Accordingly, there exists a need for an improved system that seeks to address at least one of the aforementioned problems.

SUMMARY

The disclosure was conceptualized to provide an improved system for determining a response strategy to a set of messages received by at least one agent of a plurality of agents. To this end, the improved system considers asynchronous communication settings in which agents communicate with each other with time delays. The improved system features a communication system in which messages exchanged between agents include a sender's identification, a sent vector timestamp and the content of the message, so as to enable agents to identify a sender's identity, and to detect causal violation by detecting out-of-time messages. The improved system further enables agents to infer useful information in the messages by incorporating information-theoretic trajectory embedding (ITE) to deal with the asynchronicity. The improved system also incorporates dynamic graph neural network models to deal with the typologies of the agent communication situation. Accordingly, the improved system enables agents to cooperate with a good trade-off between the benefit of communication and cost of delayed messages. The inventors of the disclosure have further demonstrated the performance and benefit of the improved system, when compared with conventional MARL systems which ignores the asynchronization issue and leads to confusion in the communication.

According to a first aspect of the disclosure, there is provided a system for determining, a response strategy to a set of messages received by at least one agent of a plurality of agents, the system comprising a processor, the processor configured to: obtain, the set of messages received by the at least one agent, each message within the set of messages received from the at least one other agent of the plurality of agents, each message comprising, a received content parameter indicative of an instruction for the at least one agent; categorize, each message within the set of messages, into an asynchronous category comprising at least two asynchronous messages, or a synchronous category comprising at least one synchronous message; determine, a significance parameter indicative of an importance of the received content parameter of each of the at least two asynchronous messages in the asynchronous category; and determine, for the at least one agent, a response signal related to the response strategy, the response signal determined based on, the significance parameter indicative of the importance of the received content parameter, corresponding to each of the at least two asynchronous messages in the asynchronous category.

In various embodiments, each message of the set of messages further comprises, a received identification parameter indicative of an identity of a one of the at least one other agent who sent a respective message, to the at least one agent, wherein the processor is further configured to determine, for the at least one agent, the response signal related to the response strategy, based on the identification parameter, corresponding to each of the at least two asynchronous messages in the asynchronous category.

In various embodiments, each agent comprises, a local vector clock having a plurality of elements corresponding to a number of agents of the plurality of agents, each element comprising an event parameter indicative of one or more corresponding events related to a respective agent of the plurality of agents; wherein each message within the set of messages further comprises, a sent vector timestamp indicative of a sent timepoint when the message was sent, the sent vector timestamp corresponding to the local vector clock of the respective one of the at least one other agent, who sent the respective message; wherein the processor is further configured to compare, the sent vector timestamp of each message within the set of messages, with the local vector clock of the at least one agent; and categorize, each message within the set of messages, into the asynchronous category comprising the at least two asynchronous messages, or the synchronous category comprising the at least one synchronous message, based on the comparison of the sent vector timestamp of each message within the set of messages, with the local vector clock of the at least one agent.

In various embodiments, comparing, the sent vector timestamp of each message within the set of messages, with the local vector clock of the at least one agent comprises comparing, at least one element in the sent vector timestamp to a corresponding at least one element in the local vector clock of the at least one agent; determining, for each message within the set of messages, if the at least one element in the sent vector timestamp is less than the corresponding at least one element in the local vector clock of the at least one agent; and categorizing, a message within the set of messages, as the asynchronous message within the asynchronous category, if it is determined that the at least one element in the sent vector timestamp is less than the corresponding at least one element in the local vector clock of the at least one agent.

In various embodiments, the processor is further configured to determine, for each message within the set of messages, if the at least one element in the sent vector timestamp is equal to the corresponding at least one element in the local vector clock of the at least one agent; and categorize, another message within the set of messages, as the synchronous message within the synchronous category, if it is determined that the at least one element in the sent vector timestamp is equal to the corresponding at least one element in the local vector clock of the at least one agent.

In various embodiments, the processor is further configured to determine, for the at least two asynchronous messages in the asynchronous category, an ordering parameter indicative of an order in which the at least two asynchronous messages, were sent to the at least one agent by the respective one of the at least one other agent.

In various embodiments, the ordering parameter comprises an earlier order of a first asynchronous message relative to a second asynchronous message, the first asynchronous message and the second asynchronous message being within the asynchronous category, wherein the processor is further configured to compare, at least one element in a sent vector timestamp of the first asynchronous message, to a corresponding at least one element in a sent vector timestamp of the second asynchronous message, determine, if the at least one element in the sent vector timestamp of the first asynchronous messages is less than the corresponding at least one element in the sent vector timestamp of the second asynchronous message, and determine, the earlier order of the first asynchronous message relative to the second asynchronous message, if it is determined that the at least one element in the sent vector timestamp of the first asynchronous messages is less than the corresponding at least one element in the sent vector timestamp of the second asynchronous message.

In various other embodiments, the ordering parameter comprises a concurrent order of a third asynchronous message and a fourth asynchronous message, the third asynchronous message and fourth asynchronous message being within the asynchronous category, wherein the processor is further configured to compare, at least one element in a sent vector timestamp of the third asynchronous message, to a corresponding at least one element in a sent vector timestamp of the fourth asynchronous message, determine, if the at least one element in the sent vector timestamp of the third asynchronous message is less than the corresponding at least one element in the sent vector timestamp of the fourth asynchronous message, and the at least one element in the sent vector timestamp of the third asynchronous message is greater than the corresponding at least one element in the sent vector timestamp of the fourth asynchronous message, and determine, the concurrent order of the third asynchronous message and the fourth asynchronous message, if it is determined that the at least one element in the sent vector timestamp of the third asynchronous message is less than the corresponding at least one element in the sent vector timestamp of the fourth asynchronous message, and the at least one element in the sent vector timestamp of the third asynchronous message is greater than the corresponding at least one element in the sent vector timestamp of the fourth asynchronous message.

In various embodiments, the processor is further configured to determine, for the at least one agent, the response signal related to the response strategy, based on the ordering parameter, corresponding to each of the at least two asynchronous messages in the asynchronous category.

In various embodiments, the processor is further configured to determine, a number of messages within the set of messages received by the at least one agent, a number of messages sent by the at least one agent, and/or, a first mode parameter indicative of a first mode in which the at least one agent is receiving the set of messages and sending at least one sent message; and adapt, a communication topology, between the at least one agent and the at least one other agent of the plurality of agents, at a pass timepoint indicative of a time in which at least one message within the set of messages is to be passed on to the at least one other agent, based on, the number of messages within the set of messages received by the at least one agent, and/or, the number of messages sent by the at least one agent.

In various embodiments, when adapting the communication topology, the processor is further configured to, determine, a sending identification parameter indicative of an identity of the at least one other agent, in which the at least one of the message within the set of messages, is to be passed on to, at the pass timepoint; determine, a sending content parameter indicative of an instruction, of the least one of the message within the set of messages, which is to be passed on to the at least one other agent, at the pass timepoint; determine, a second mode parameter indicative of a second mode, in which the at least one of the message within the set of messages, is to be passed on to the at least one other agent, at the pass timepoint; and adapt, the communication topology based on, at least one of the sending identification parameter, the sending content parameter, and/or the mode parameter.

In various embodiments, when determining the significance parameter indicative of the importance of the received content parameter, the processor is further configured to, obtain, an information parameter indicative of an information about the instruction, for the at least one agent; obtain, an uncertainty parameter indicative of a measure of an uncertainty of the instruction, for the at least one agent; and determine, the significance parameter indicative of the importance of the received content parameter, based on, the information parameter, and/or the for the uncertainty parameter.

In various embodiments, the response signal related to the response strategy comprises executing, by the at least one agent, the instruction contained in the received content parameter of the asynchronous message, or not executing, by the at least one agent, the instruction contained in the received content parameter of the asynchronous message.

In various embodiments, the plurality of agents each comprise, another processor, and wherein the processor is further configured to transmit, the response signal related to the response strategy, to the another processor of the at least one agent.

According to a second aspect of the disclosure, there is provided a distribution facility comprising the system of the first aspect.

According to a third aspect of the disclosure, there is provided a control device comprising a processor for determining, a response strategy to a set of messages received by the at least one agent, the processor being in data communication with a memory having instructions stored therein, the instructions, when executed by the processor, causes the processor to: obtain, the set of messages received by the at least one agent, each message within the set of messages received from the at least one other agent of the plurality of agents, each message comprising, a received content parameter indicative of an instruction for the at least one agent; categorize, each message within the set of messages, into an asynchronous category comprising at least two asynchronous messages, or a synchronous category comprising at least one synchronous message; determine, a significance parameter indicative of an importance of the received content parameter, of each of the at least two asynchronous messages in the asynchronous category; and determine, for the at least one agent, a response signal related to the response strategy, the response signal determined based on, the significance parameter indicative of the importance of the received content parameter, corresponding to each of the at least two asynchronous messages in the asynchronous category.

According to a fourth aspect of the disclosure, there is provided a method for determining, a response strategy to a set of messages received by the at least one agent, the method comprising a processor for: obtaining, the set of messages received by the at least one agent, each message within the set of messages received from the at least one other agent among the plurality of agents, each message comprising, a received content parameter indicative of an instruction for the at least one agent; categorizing, each message within the set of messages, into an asynchronous category comprising at least two asynchronous messages, or a synchronous category comprising at least one synchronous message; determining, a significance parameter indicative of an importance of the received content parameter, of each of the at least two asynchronous messages in the asynchronous category; and determining, for the at least one agent, a response signal related to the response strategy, the response signal determined based on, the significance parameter indicative of the importance of the received content parameter, corresponding to each of the at least two asynchronous messages in the asynchronous category.

According to a fifth aspect of the disclosure, there is provided a computer readable medium comprising instructions, which when executed by the processor, causes the processor to perform the method of the fourth aspect of the disclosure.

BRIEF DESCRIPTION OF THE DRAWINGS

The disclosure will be better understood with reference to the detailed description when considered in conjunction with the non-limiting examples and the accompanying drawings, in which:

FIG. 15 shows an exemplary schematic illustration of a RWARE environment 1500 on which the system 100, 900, 1000 (also known as AGICom) was evaluated on;

FIG. 16 shows an exemplary schematic illustration of a LBF environment 1600 on which system 100, 900, 1000 AGICom was evaluated on;

DETAILED DESCRIPTION

Figure 1:
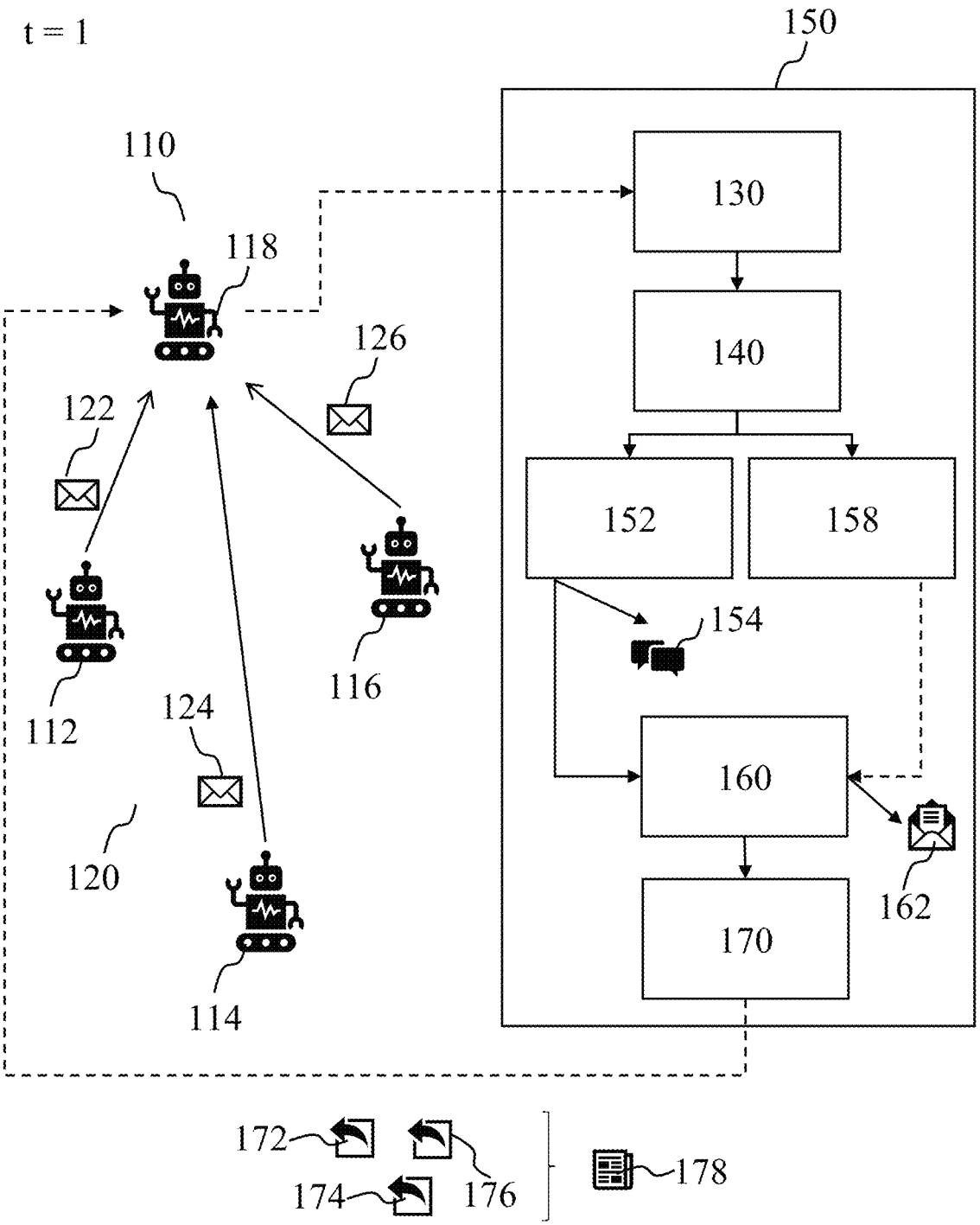
FIG. 1 shows an exemplary schematic illustration of a system 100 for determining 170, a response strategy 178 to a set of messages 120 received by a receiving agent 118, of a plurality of agents 110.

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements. As used herein, the term "and/or" includes any and all combinations of one or more of the associated listed items.

While such terms as "first," "second," etc., may be used to describe various elements, such elements must not be limited to the above terms. The above terms are used only to distinguish one element from another, and do not define corresponding elements, for example, an order and/or significance of the elements. Without departing a scope of rights of the specification, a first element may be referred to as a second element, and similarly, the second element may be referred to as the first element.

Throughout the description, the term "agent", as used herein, may refer to a machine capable of exchanging messages with other agents of the plurality of agents, and performing a series of predefined actions and tasks. Each agent may include one or more processors, and each agent may be in data communication with each other, and a processor of the system. In various embodiments, an agent may be capable of sending or receiving messages to and from other agents of the plurality of agents, and may further be pre-programmed to perform the series of predefined actions and tasks. In some embodiments, the agent may be a robot. In an embodiment, the agent may be a robot pre-programmed to perform actions and tasks suitable for a distribution facility, such as a warehouse.

Throughout the description, the term "message(s)", as used herein, may refer to data or information exchanged, e.g. sent or received, among the plurality of agents. The term "message" may include messages sent from an agent to another agent to convey data, and may also include messages received from another agent to receive data. Each message may include a received vector timestamp of a message received by a receiving agent, and a sent vector timestamp of the same message sent by the other agent to the receiving agent. In various embodiments, the received vector timestamp may correspond to a local vector clock of the receiving agent. In the context of the disclosure, a received message may be a synchronous message or an asynchronous message, depending on the comparisons between the received vector timestamp, and the sent vector timestamp of the message. The term "synchronous message" may refer to messages in which the sent vector timestamp is the same as the received vector timestamp; and the term "asynchronous message" may refer to messages in which the sent vector timestamp is differs to the received vector timestamp. In other words, for an asynchronous message, the timeline of the received message from the perspective of the receiving agent, may be disturbed and may not be the sending timeline of said message.

Throughout the description, the term "response signal", as used herein, may refer to a response to a received message in the set of messages, the response of which is in relation to a received content parameter of the received message. Accordingly, the term "response strategy" may refer to a set of responses to each received message of the set of messages, which may comprise a received asynchronous message or a received synchronous message. In other words, the response strategy may include response signals to asynchronous and synchronous messages of the set of messages received by the receiving agent.

Throughout the description, the term "obtain", as used herein, may refer to the processor which actively obtains, or passively receives information, e.g. parameters, data or information, from one or more processors and/or sensors of the agents. The processor may also obtain various data types from a communication interface, e.g. a user interface. The communication interface may be located on the processor of the system, or on the agent. The processor may also receive or obtain the various data types via a memory, a register or an analog-to-digital port.

Throughout the description, the term "mode", as used herein, may refer to a communication structure or topology of the exchange of messages, i.e. sending and receiving of messages, among the plurality of agents. In various embodiments, the term mode may be suitable for communication among agents in MARL systems. Non-limiting examples of communication structure or topology of MARL systems include: a full communication topology, a center communication topology, a group communication topology, a broadcast communication topology, a mixed communication topology.

Throughout the description, the term "processor", refers to a circuit, including analog circuits or components, digital circuits or components, hybrid circuits or components. Any other kind of implementation of the respective functions which will be described in more detail below may also be understood as a "circuit" in accordance with an alternative embodiment. A digital circuit may be understood as any kind of a logic implementing entity, which may be special purpose circuitry or a processor executing software stored in a memory, firmware, or any combination thereof. The processor may also include a single stand-alone computer, a single dedicated server, multiple dedicated servers, and/or a virtual server running on a larger network of servers and/or cloud-based services. In various embodiments, the processor may be a controller or part thereof, used to determine and control the response strategy comprising the response signal to a received message, for an agent.

FIG. 1 shows an exemplary schematic illustration of a system 100 for determining 170, a response strategy 178 to a set of messages 120 received by a receiving agent 118, of a plurality of agents 110, in accordance with an aspect of the disclosure. The system 100 may determine 170 the response strategy 178 at a first timepoint, e.g. t=1, during a predetermined timeline of an exchange of messages 120 among the plurality of agents 110.

Referring to FIG. 1, the plurality of agents 110 may include a first agent 112, a second agent 114, a third agents 116, and a receiving agent 118, each agent 110 being in data communication with each of the other agents 110. In various embodiments, a receiving agent 118 may receive the set of messages 120 from at least one of the other agents. For example, the receiving agent 118 may receive a first message 122 from the first agent 112, a second message 124 from the second agent 114, and a third message 126 from the third agent 116, and the set of messages 120 may include the first 122, second 124 and third 126 messages.

System 100 further includes a processor 150, and each agent 110 may be in data communication with the processor 150. Each agent 110 may communicate with each other, and the processor 150, using pre-defined wireless communication protocols which include: global system for mobile communication (GSM), enhanced data GSM environment (EDGE), wideband code division multiple access (WCDMA), code division multiple access (CDMA), time division multiple access (TDMA), wireless fidelity (Wi-Fi), voice over Internet protocol (VOIP), worldwide interoperability for microwave access (Wi-MAX), Wi-Fi direct (WFD), an ultra-wideband (UWB), infrared data association (IrDA), Bluetooth, ZigBee, SigFox, LPWan, LoRaWan, GPRS, 3G, 4G, LTE, and 5G communication systems. Alternatively, it is contemplated that each agent 110 may communicate with each other, and the processor 150 via wired means.

In various embodiments, the processor 150 is configured to process the set of messages 120 received by the receiving agent 118 to determine 170 an appropriate the response strategy 178. The processor 150 is configured to obtain 130, the set of messages 120 received by the receiving agent 118, each message 120 including a received content parameter 430 indicative of an instruction 432 for the receiving agent 118. In various embodiments, each message 120 may also include a received identification parameter 410, and a sent vector timestamp 420.

The processor 150 is further configured to categorize 140, each message 120 within the set of messages 120 into an asynchronous category 152 or a synchronous category 158. The asynchronous category 152 may include at least one asynchronous message, and in some embodiments, may include at least two asynchronous messages. The synchronous category 158 may include at least one synchronous message.

The processor 150 is further configured to determine 160, a significance parameter 162 indicative of an importance of the received content parameter 430 of each asynchronous message within the asynchronous category 152. In various embodiments, the processor 150 may be further configured to determine 160, the significance parameter 162 indicative of the importance of the received content parameter 430 of each synchronous message within the synchronous category 158.

The processor 150 is further configured to determine 170, the response strategy 178 for the set of messages 120 received by the receiving agent 118. In various embodiments, the response strategy 178 may include a set of response signals 172, 174, 176, corresponding to each message 120 of the set of messages 120, regardless of whether said message 120 may be categorized as an asynchronous message or a synchronous message. For example, the response strategy 178 may include a first response signal 172 to the first message 122, a second response signal 174 to the second message 124, and a third response signal 176 to the third message 126. Each of the first 122, second 124 or third 126 messages may be an asynchronous message or a synchronous message. In various embodiments, each of the first 172, second 174 and third 176 response signals may be determined based on the significance parameter 162 corresponding to the respective one of the first 122, second 124, and third 126 messages received by the receiving agent 118.

In various embodiments, for each synchronous message categorized within the synchronous category 158, the response signal 172, 174, 176 may comprise a command to the receiving agent 118 to execute, the instruction 432 contained in the received content parameter 430 of the message 120. In various embodiments, for each asynchronous message categorized within the asynchronous category 152, the response signal 172, 174, 176 may comprise a command to the receiving agent 118 to execute, the instruction 432 contained in the received content parameter 430 of the message 120. Or may comprise a command to the receiving agent 118 to not execute, the instruction 432 contained in the received content parameter 430 of the message 120.

As shown in FIG. 1, the response strategy 178 comprising the each of the response signal 172, 174, 176, may be transmitted to another one or more processors of the receiving agent 119, to enable the receiving agent 119 to adjust its response to the set of messages 120 received.

Figure 2:
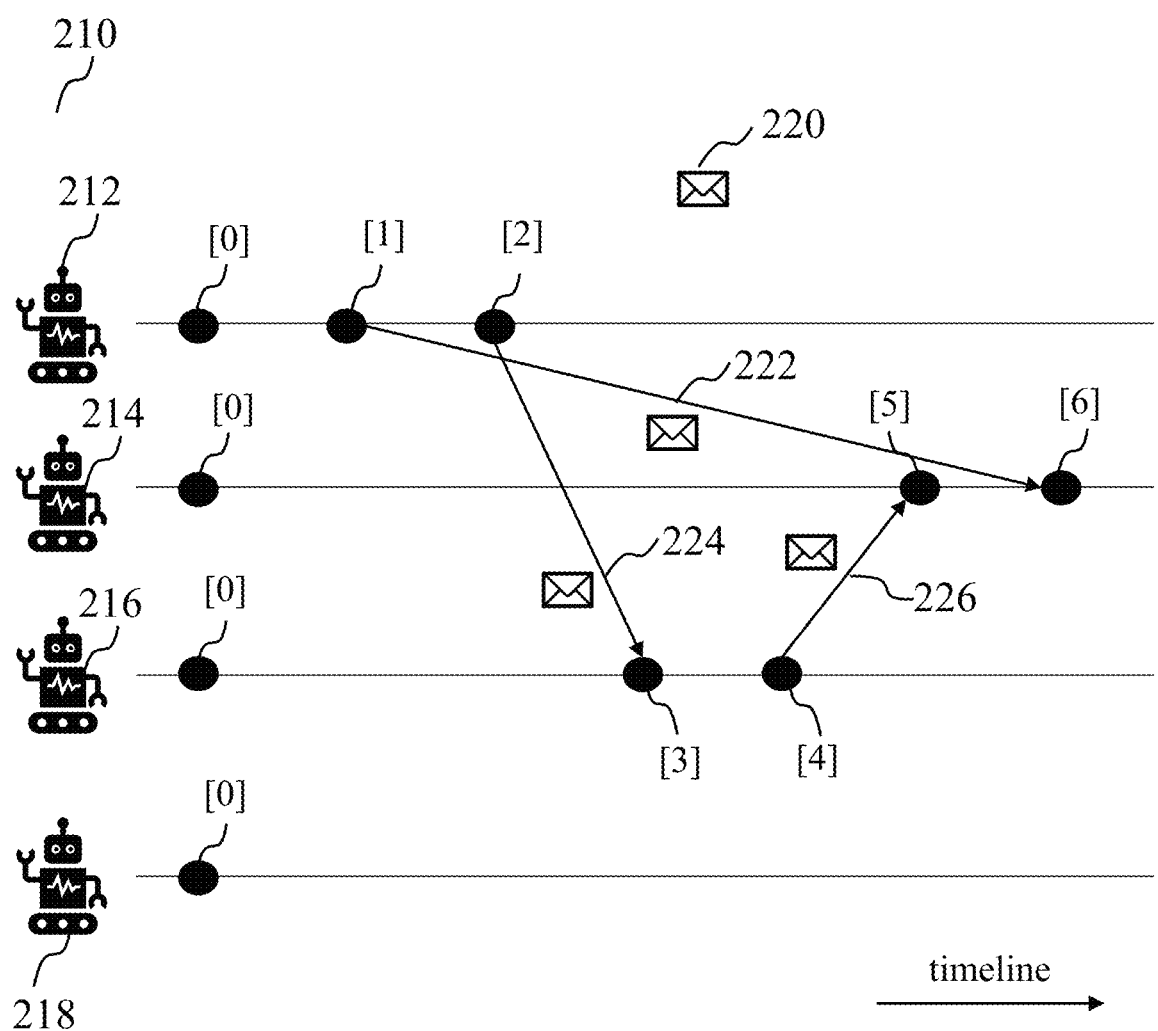
FIG. 2 shows an exemplary simple clock traditionally employed in conventional MARL systems 200, for the exchange of messages 220 among a plurality of agents 210.

FIG. 2 shows an exemplary simple clock traditionally employed in conventional MARL systems 200, for the exchange of messages 220 among a plurality of agents 210. The plurality of agents 210 may include a first 212, second 214, third 216 and fourth 218 agents, and each of which may maintain a simple clock.

As shown in FIG. 2 each agent 210 assigns a single integer as the timestamp to the message 220, and the simple clock maintained by each agent 210 acts as a counter to label the sending and receiving of messages among the plurality of agents 210. For example, in the case of a message 220 that is sent, the counter of the simple clock is incremented, and the message is sent. The sent message 220 then carries the new incremented timestamp. In the case of a message that is received, the receiver's simple clock is incremented and the message 220 is said to have been received at the new incremented clock value.

The simple clock of each of the first 212, second 214, third 216 and fourth 218 agents may be initialized with a [0] integer. As shown in FIG. 2, a first agent 212 may send a first message 222 to the second agent 214 indicating that an object is to be given to the second agent 214, and the simple clock of the first agent 212 may be incremented by an integer, i.e. having a value of [1]. The first agent 212 may then send a second message 224 informing the third agent 216 that said object has been passed to the second agent 214, and accordingly, the clocks of the first agent 212 may be incremented by an integer, i.e. having a value of [2], and the clock of the third agent 216 may be incremented by an integer, i.e. having a value of [3]. In response, the third agent 216 may send a third message 226 to the second agent 214 to request for use of that object and accordingly, the clocks of the third agent 212, which sends the third message 226 may be incremented by an integer, i.e. having a value of [4], and the clock of the second agent 214, which receives the third message 226, may be incremented by an integer, i.e. having a value of [5].

However, as shown in FIG. 2, the communication channel of system 200, may be slower, for example, due to inconsistent clock rates or dynamic distances between the agents 210. Consequently, the second agent 214 may only receive the first message 222 from the first agent 212, i.e. that said object has been passed to the second agent 214, at the simple clock count of [6], and accordingly, the third agent's 216 request to use said object as communicated in the third message 226, fails.

The simple clock used in conventional MARL systems 200 may therefore not be suitable for detecting causality violation, which results in message ordering problems due to slow communication channels. This results in an agent 210, e.g. third agent 216, taking an action based on information that another agent 210, e.g. second agent 214, has not yet received but should have received. That is, the simple clock having a simple incremental counter does not give results that are consistent with casual events, and may not detect causality violation among the messages 220 exchanged in conventional MARL systems 200. In addition, when an agent 210 broadcasts messages 220 in conventional MARL systems 200, an agent 210 must further determine which other agent 210 sent the message 220, since messages 220 exchanged in such conventional systems 200 do not include a sender's identification.

Figure 3:
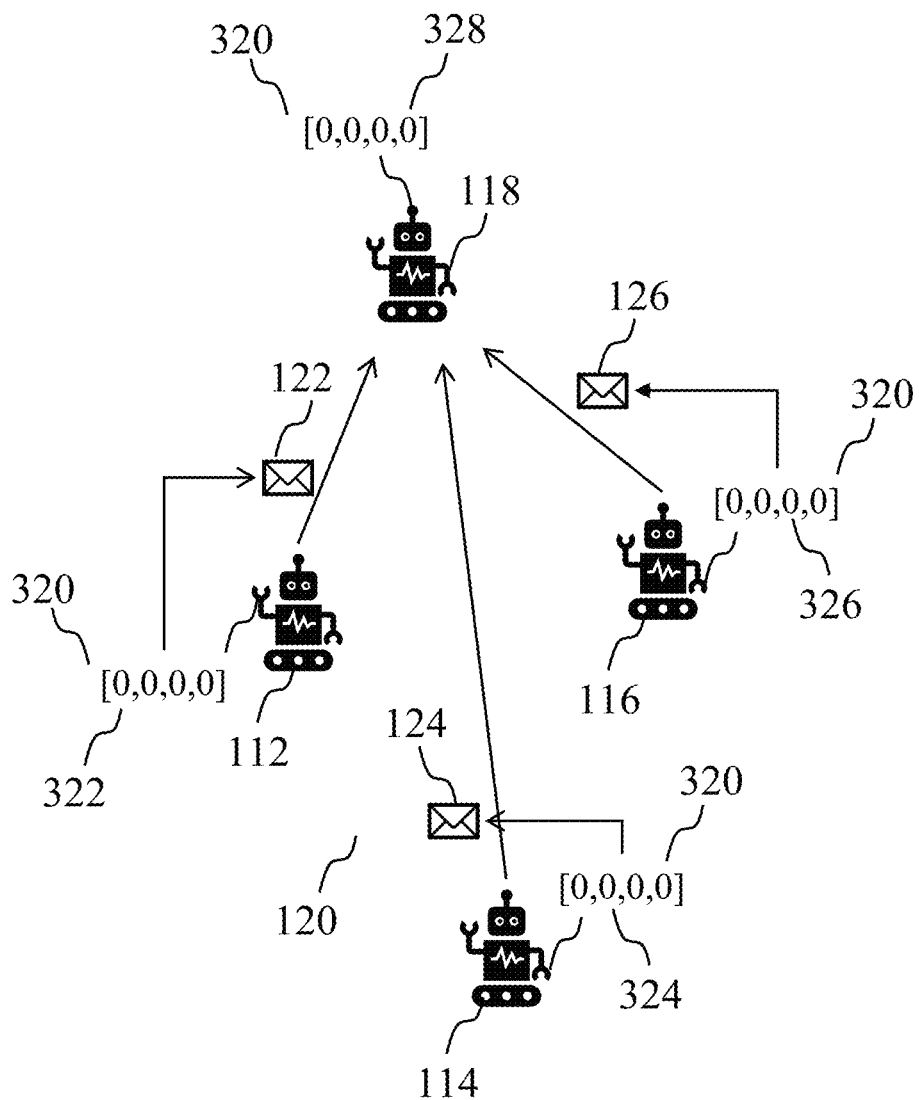
FIG. 3 shows an exemplary schematic illustration of system 300, in which each agent 110 is labelled with a local vector clock 320.

FIG. 3 shows an exemplary schematic illustration of system 300, in which each agent 110 is labelled with a local vector clock 320. The system 100 as shown in FIG. 3 may be based on the system 100 of FIG. 1, the processor 150 of which is omitted for clarity.

Referring to FIGS. 1 and 3, each agent 110 may be labelled with a local vector clock 320 having a plurality of elements corresponding to a number of agents 110 among the plurality of agents 110. For example, the local vector clock 320 of each agent 110 may have a length of 4, corresponding to the first 112, second 114, third 116 agents, and the receiving agent 118.

In the local vector clock 320 of each agent 110, each element 322, 324, 326, 328 may include an event parameter indicative of one or more corresponding events related to the respective agent 110. In the context of the disclosure, an event may be related to the sending of, or receiving of, messages 120 by a respective agent 110. For example, first element 322 may correspond to messages 120 sent and/or received by the first agent 112; second element 324 may correspond to messages 120 sent and/or received by the second agent 114; third element 326 may correspond to messages 120 sent and/or received by the third agent 116; and fourth element 328 may correspond to messages sent and/or received by the receiving agent 118.

The counter of the local vector clock 320 of each agent 110 may be based on a set of rules. In various embodiments, the local vector clock 320 of each agent 110 may be first initialized with an all-zero vector, as shown in FIG. 3. Once an agent 110, e.g. receiving agent 118 receives a message 120 from the other agent 110, the value of the other agent's 110 entry in the local vector clock 320 of the agent 110 is incremented by 1. Similarly, every time an agent 110 sends a message, the value of the agent's 110 entry in its own local vector clock 320 is incremented by 1. In other words, the local vector clock 320 labels every agent 110 with a vector comprising elements 322, 324, 326, 328, e.g. integers for each local clock, corresponding to a respective agent 110.

Figure 4:
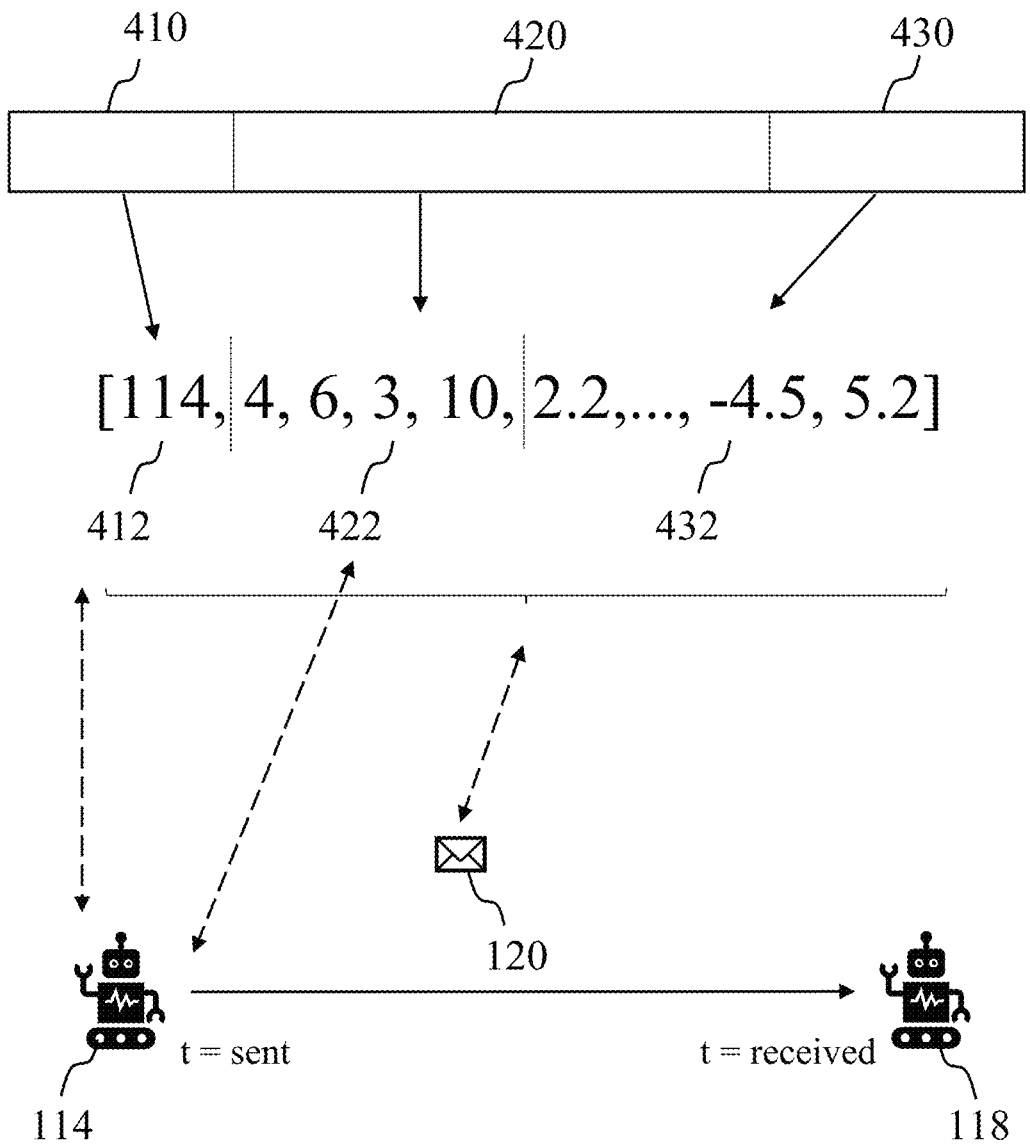
FIG. 4 shows an exemplary schematic illustration of messages 120 exchanged among the plurality of agents 110 in system 100.

FIG. 4 shows an exemplary schematic illustration of messages 120 exchanged among the plurality of agents 110 in system 100. Referring to FIG. 4, each message 120 may include a received identification parameter 410 indicative of an identity 412 of the agent 110 who sent the message 120; a sent vector timestamp 420 indicative of a sent timepoint 422 when the message 120 was sent by the respective agent 110; and a received content parameter 430 indicative of an instruction 432 for the agent 110. In various embodiments, the sent vector timestamp 420 may correspond to the local vector clock 320 of the respective one of the other agents' 110 who sent the respective message 120, and may be earlier than the first timepoint, e.g. t=1, for determining 170 the response strategy 178.

Referring to FIG. 4 as an example, second message 124 may be sent by the second agent 114 to the receiving agent 118. Sent second message 124 may include, the identity 412 of the second agent 114; the sent vector timestamp 420 corresponding to the local vector clock 320 of the second agent 114 at the time the message 124 was sent by the second agent 114; and the received content parameter 430 indicative of the instruction 432 contained in the second message 124 addressed to the receiving agent 118.

Figure 5:
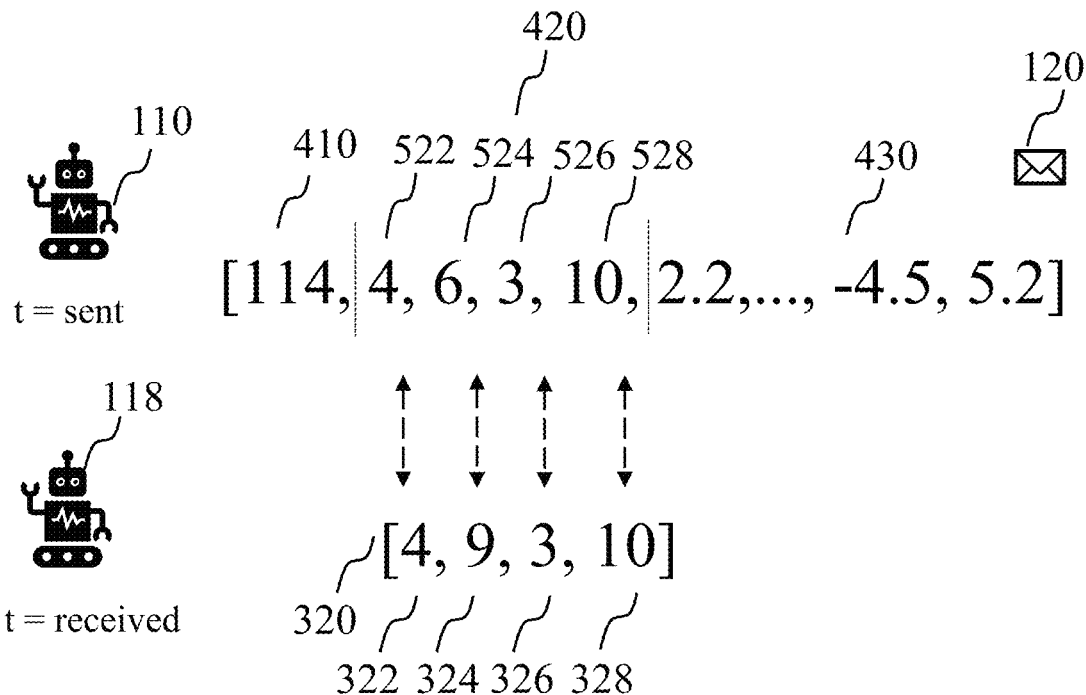
FIG. 5 shows exemplary schematic illustrations 500A and 500B for categorizing 140, each message 120 within the set of messages 120, into the asynchronous category 152 comprising asynchronous messages, or the synchronous category 158 comprising synchronous messages.
Figure 5:
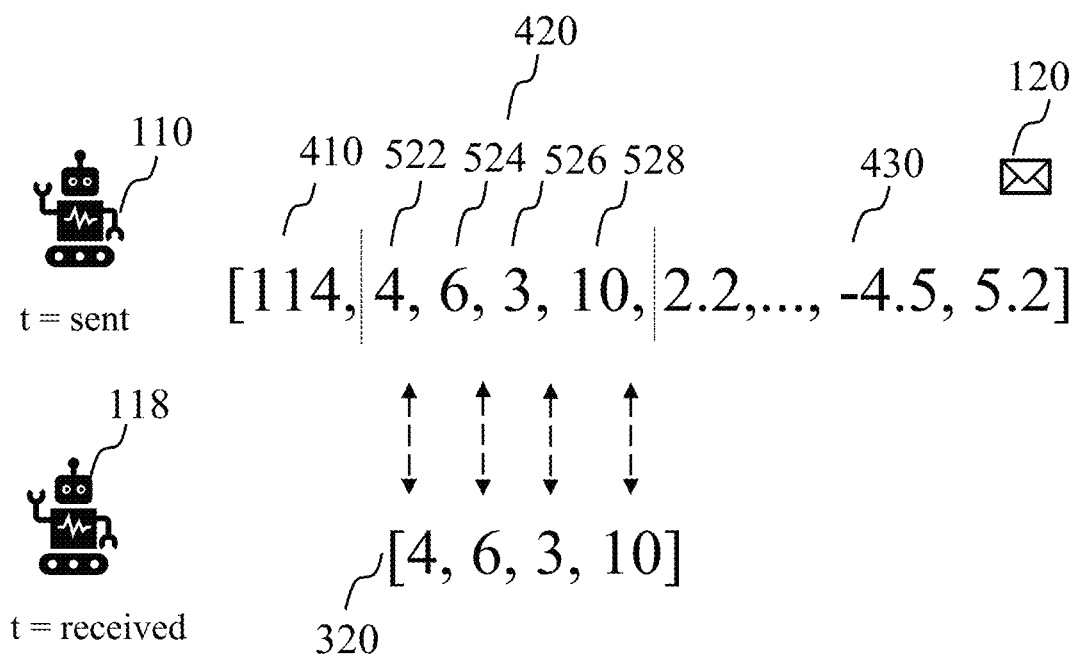

FIG. 5 shows exemplary schematic illustrations 500A and 500B for categorizing 140, each message 120 within the set of messages 120, into the asynchronous category 152 comprising asynchronous messages, or the synchronous category 158 comprising synchronous messages. In various embodiments, the timepoint at which the agent 110, e.g. receiving agent 118 receives the message 120 may correspond to the local vector clock 320 of said agent 110.

Referring to FIGS. 1 and 3 to 5, the processor 150 may be configured to compare, the sent vector timestamp 420 of each message 120 within the set of messages 120 with the local vector clock 320 of the receiving agent 118, at the timepoint at which the receiving agent 118 receives said message 120. In various embodiments, the processor 150 may compare each element 522, 524, 526, 528 of the sent vector timestamp 420 to a corresponding element 322, 324, 326, 328 in the local vector clock 320 of the receiving agent 118. For example, the first 522, second 524, third 526 and fourth 528 elements of the sent vector timestamp 420 may be compared with the respective first 322, second 324, third 326, and fourth 328 elements in the local vector clock 320 of the receiving agent 118.

The processor 150 may be further configured to categorize 140, the message 120 as an asynchronous message within the asynchronous category 152, if it is determined that at least one element 522, 524, 526, 528 in the sent vector timestamp 420 is less than the corresponding at least one element 322, 324, 326, 326 in the local vector clock 320 of the receiving agent 118. Referring to example 500A of FIG. 5, the second element 522 of the sent vector timestamp 420 may be less than the corresponding second element 322 of the local vector clock 320 of the receiving agent 118, i.e. integer "6" may be less than "9", and the message 120 may therefore be categorized as an asynchronous message.

In various embodiments, the processor 150 may be further configured to categorize 140, the message 120 as a synchronous message within the synchronous category 158, if it is determined that at least one element 522, 524, 526, 528 in the sent vector timestamp 420 is equal to the corresponding at least one element 322, 324, 326, 326 in the local vector clock 320 of the receiving agent 118. In some embodiments, the message 120 may be categorized as a synchronous message within the synchronous category 158, if it is determined that each element 522, 524, 526, 528 in the sent vector timestamp 420 is equal to the corresponding element 322, 324, 326, 326 in the local vector clock 320 of the receiving agent 118. Referring to example 500B of FIG. 5, each element 522, 524, 526, 528 in the sent vector timestamp 420 of message 120 may be equal to the corresponding element 322, 324, 326, 326 in the local vector clock 320 of the receiving agent 118, and the message 120 may therefore be categorized as a synchronous message.

Figure 6:
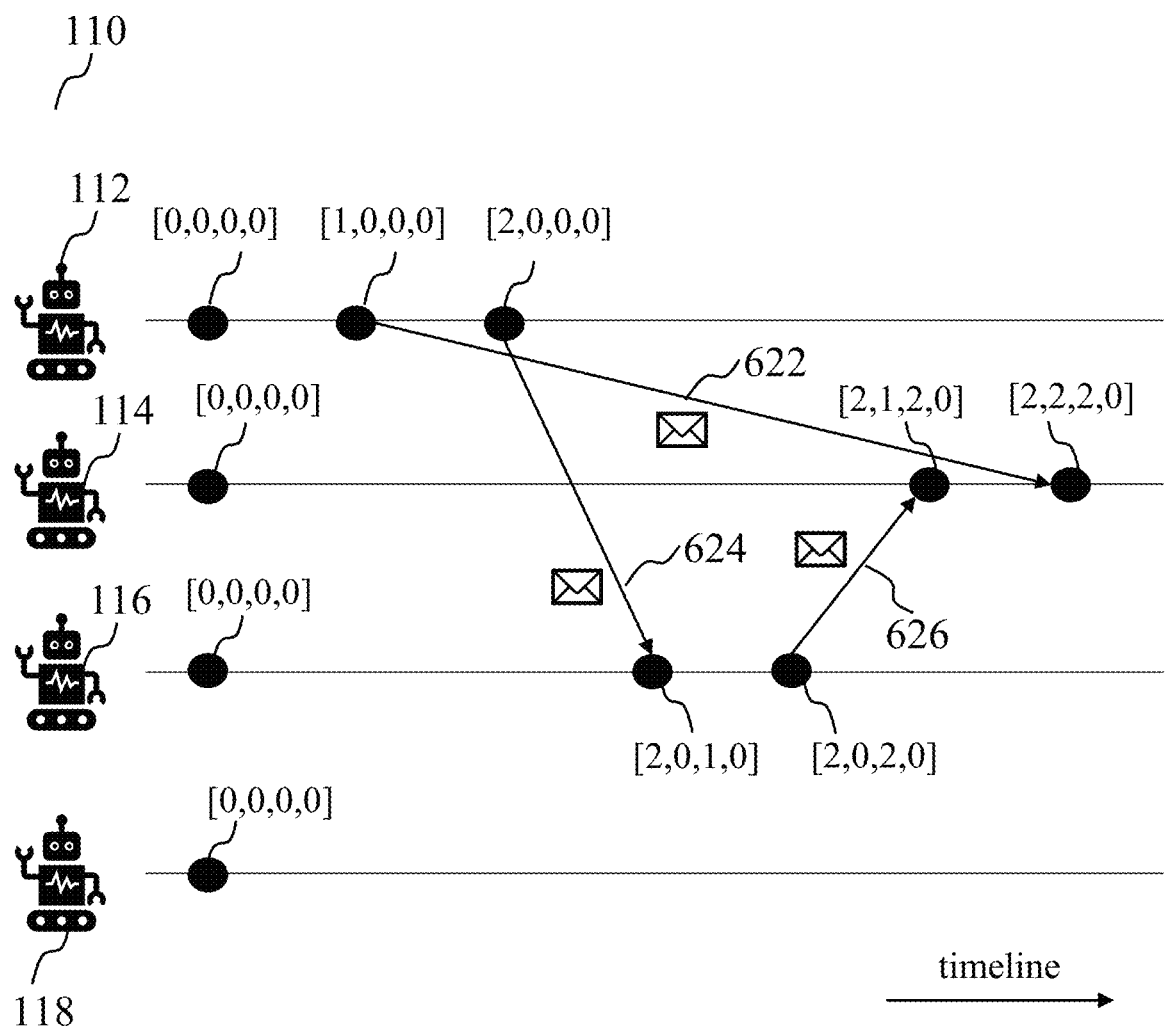
FIG. 6 shows an exemplary schematic illustration of the local vector clock 320 for detecting causality violation during the exchange of messages 120 among the plurality of agents 110 of system 100.

FIG. 6 shows an exemplary schematic illustration of the local vector clock 320 for detecting causality violation during the exchange of messages 120 among the plurality of agents 110 of system 100. The example shown in FIG. 6 may be based on the example of conventional MARL systems 200 shown of FIG. 2, with the exception that in FIG. 6, each agent 110 maintains a local vector clock 320 instead of a simple clock.

In FIG. 6, each of the first 112, second 114, third 116 and the receiving 118 agents, may maintains a respective local vector clock 320. Messages 622, 624 and 626 may correspond to respective messages 222, 224 and 226 as described with reference to FIG. 2. The counts of the local vector clock 320 of each agent 110 may be based on the rules described with reference to FIG. 3.

In the same example as shown in FIG. 2, it may be seen that the first message 622 sent from the first agent 112 to the second agent 114 may be an out-of-time and asynchronous message. Specifically, the sent vector timestamp 420 of message 622 may be [1, 0, 0, 0], which is less than the respective corresponding elements of [2, 1, 2, 0] of the local vector clock 320 of the second agent 114, thereby indicating that causality violation has occurred. That is, the second agent 114 had already seen that the first agent 112 had sent the third agent 616 the second message 624 informing that the object has been passed to the second agent 114, even before the second agent 114 had received the first message 622, which informs the second agent 114 that the first agent 112 may be passing the object to the second agent 114. Accordingly, system 100 in which each agent 110 maintains a local vector clock 320 may be suitable for detecting casual events, and causality violation(s).

Referring back to FIG. 1, the processor 150 of system 100 may be further configured to, determine for the asynchronous messages categorized within the asynchronous category 152, an ordering parameter 154 indicative of an order in which the at least two of the asynchronous messages were sent to the receiving agent 118 by a respective one of the other agents 110, e.g. first 112, second 114 and/or third 116 agents. In various embodiments, the ordering parameter 154 may comprise, an earlier order, or a concurrent order.

Figure 7:
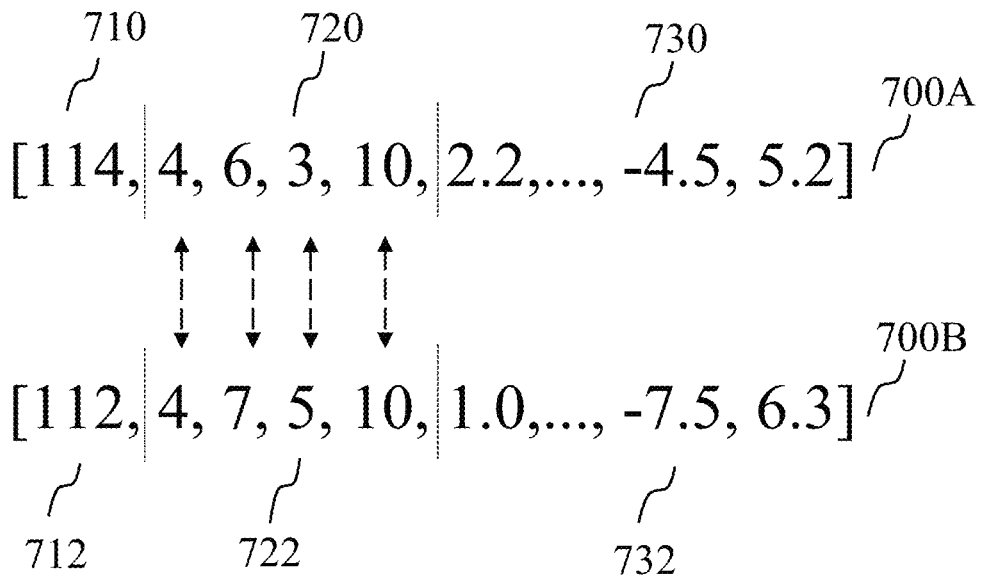
FIG. 7 shows an exemplary schematic illustration of determining the ordering parameter 154 comprising an earlier order of a first asynchronous messages 700A relative to a second asynchronous message 700B, within the asynchronous category 152.

FIG. 7 shows an exemplary schematic illustration of determining the ordering parameter 154 comprising an earlier order of a first asynchronous message 700A relative to a second asynchronous message 700B, within the asynchronous category 152. In some embodiments, first 700A and second 700B asynchronous messages may each include a received identification parameter 710, 712, a sent vector timestamp 720, 722, and a received content parameter 730, 732, respectively.

Referring to FIGS. 1 and 7, the processor 150 may be configured to compare, elements in the sent vector timestamp 720 of a first asynchronous message 700A to corresponding elements in the sent vector timestamp 722 of a second asynchronous message 700B. The processor 150 may further determine, the earlier order of the first asynchronous message 700A relative to the second asynchronous message 700B, if it is determined that at least one element in the sent vector timestamp 720 of the first asynchronous message 700A is less than a corresponding element in the sent vector timestamp 722 of the second asynchronous message 700B. In various embodiments, the earlier order of the first asynchronous message 700A relative to the second asynchronous message 700B is determined if at least one element in the sent vector timestamp 720 of the first asynchronous message 700A is less than or equal to a corresponding element in the sent vector timestamp 722 of the second asynchronous message 700B, and at least one element in the sent vector timestamp 720 of the first asynchronous message 700A is less than the corresponding element in the sent vector timestamp 722 of the second asynchronous message 700B.

For example, the sent vector timestamp 720 of first asynchronous message 700A may be [4, 6, 3, 10], which may be compared to corresponding elements [4, 7, 5, 10] in the sent vector timestamp 722 of second asynchronous message 700B. It may be seen that at least one element in the sent vector timestamp 720 of the first asynchronous message 700A is less than or equal to a corresponding element in the sent vector timestamp 722 of the second asynchronous message 700B, and at least one element in the sent vector timestamp 720 of the first asynchronous message 700A is less than the corresponding element in the sent vector timestamp 722 of the second asynchronous message 700B. Accordingly, the processor 150 may determine that first asynchronous message 700A was sent earlier than second asynchronous message 700B.

Figure 8:
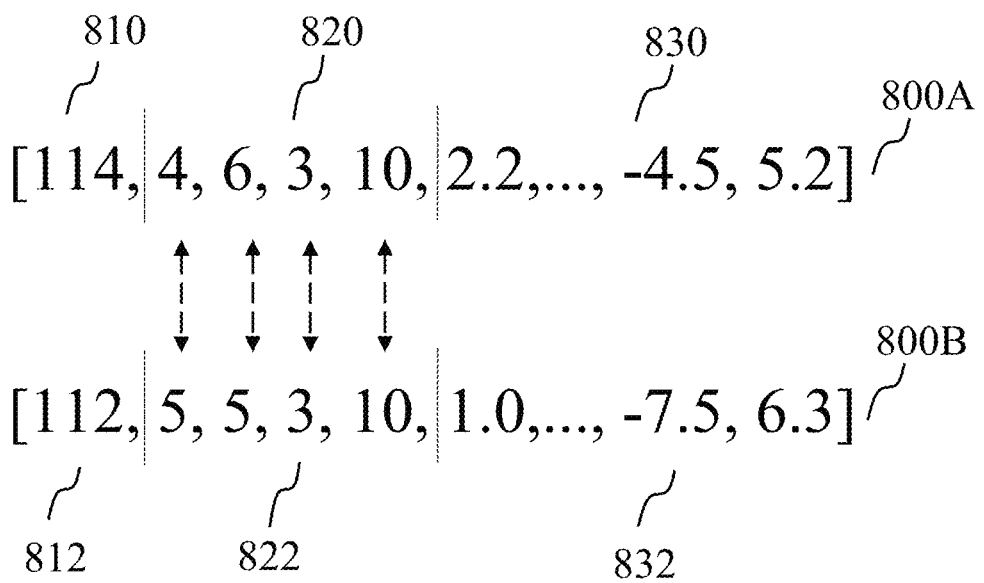
FIG. 8 shows an exemplary schematic illustration of determining the ordering parameter 154 comprising a concurrent order of a third asynchronous messages 800A and a fourth asynchronous message 800B, within the asynchronous category 152.

FIG. 8 shows an exemplary schematic illustration of determining the ordering parameter 154 comprising a concurrent order of a third asynchronous messages 800A and a fourth asynchronous message 800B, within the asynchronous category 152. In accordance with messages of the disclosure, third 800A and fourth 800B asynchronous messages may each include a received identification parameter 810, 812, a sent vector timestamp 820, 822, and a received content parameter 830, 832, respectively.

Referring to FIGS. 1 and 8, the processor 150 may be configured to compare, elements in the sent vector timestamp 820 of a third asynchronous message 800A to corresponding elements in the sent vector timestamp 822 of a fourth asynchronous message 800B. The processor 150 may further determine, the concurrent order of the third asynchronous message 800A relative to the fourth asynchronous message 800B, if it is determined that at least one element in the sent vector timestamp 820 of the third asynchronous message 800A is less than a corresponding element in the sent vector timestamp 822 of the fourth asynchronous message 800B, and at least one element in the sent vector timestamp 820 of the third asynchronous message 800A is greater than the corresponding element in the sent vector timestamp 822 of the fourth asynchronous message 800B.

For example, the sent vector timestamp 820 of third asynchronous message 800A may be [4, 6, 3, 10], which may be compared to corresponding elements [5, 5, 3, 10] in the sent vector timestamp 822 of fourth asynchronous message 800B. It may be seen that least one element in the sent vector timestamp 820 of the third asynchronous message 800A is less than a corresponding element in the sent vector timestamp 822 of the fourth asynchronous message 800B, and at least one element in the sent vector timestamp 820 of the third asynchronous message 800A is greater than the corresponding element in the sent vector timestamp 822 of the fourth asynchronous message 800B. Accordingly, the processor 150 may determine that third asynchronous message 800A and fourth asynchronous message 800B were sent concurrently.

Referring to FIGS. 1 and 3 to 8, it may be seen that system 100 which includes message 120 including a received identification parameter 410, 710, 712, 810, 812, a sent vector timestamp 420, 720, 722, 820, 822 and a received content parameter 430, 730, 732, 830, 832, allows the processor 150 to detect causality violation, by determining if a message 120 may be an asynchronous message or a synchronous message. Accordingly, the processor 150 may be configured to further determine 170, the response signal 172, 174, 176 related to the response strategy 178, based on the categorization 140 of the messages 120 within the asynchronous category 152 or the synchronous category 158, the ordering parameter 154, the significance parameter 162 and the received identification parameter 410 corresponding to each message 120 within the set of messages 120.

Figure 9:
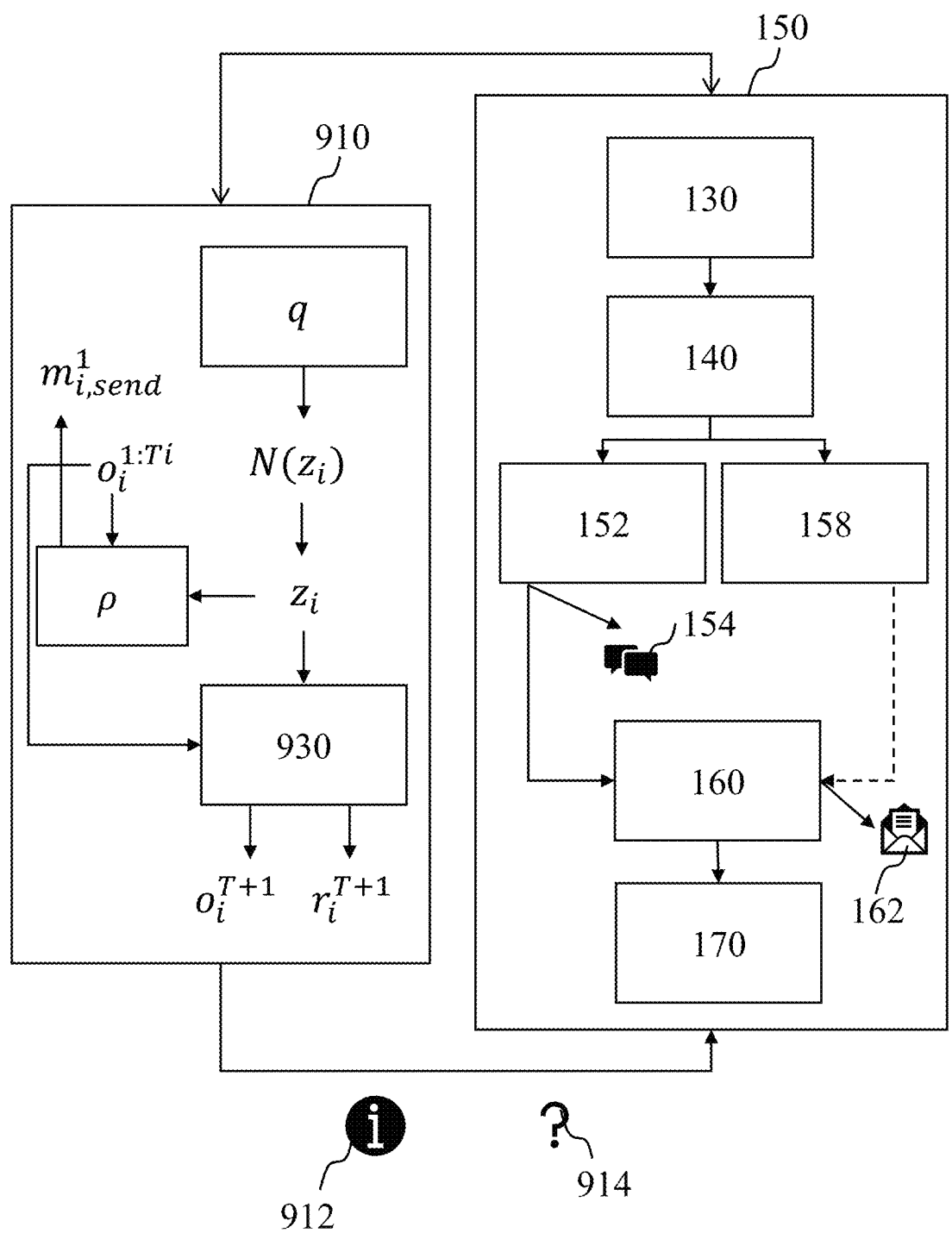
FIG. 9 shows an exemplary schematic illustration of system 900, for determining the significance parameter 162 of an asynchronous message categorized within the asynchronous category 152, to enable the receiving agent 118 to determine how the asynchronous message may be utilized.

FIG. 9 shows an exemplary schematic illustration of system 900, for determining the significance parameter 162 of an asynchronous message categorized within the asynchronous category 152, to enable the receiving agent 118 to determine how the asynchronous message may be utilized. The system 900 as shown in FIG. 9 may be based on the system 100 of FIG. 1, the plurality of agents 110 and set of messages 120 of which is omitted for clarity.

Referring to FIGS. 1 and 9, the processor 150 may be in data communication with another processor 910, and may determine the significance parameter 162 indicative of the importance of the asynchronous messages within the asynchronous category 152, in order to enable the receiving agent 118 to adjust the response strategy 178 in response to the set of messages 120. To determine the significance parameter 162, the processor 150 may be configured to obtain, an information parameter 912 indicative of an information about the instruction 432 of the received content parameter 430; and to obtain, an uncertainty parameter 914 indicative of a measure of an uncertainty of the instruction 432 of the received content parameter 430, for the receiving agent 118.

In various embodiments, the information parameter 912 and uncertainty parameter 914 of an instruction 432 may be based on a trained neural network model, based on Information-theoretic Trajectory Embedding (ITE) N(z) from agent 110 trajectories, which consist of observations, actions and rewards, which provide agent 110 (also referred to as agent i in the disclosure) policies $\pi_i(a_t^i|o_{1:t}^i, m_{i,rec}^t N(z))$ where $a_t^i$ refers to an action of the receiving agent 118, $o_{1:t}^i$, $m_{i,rec}^t N(z)$ refers to observations of the receiving agent 118 in relation to the received message 120 and their associated trajectories z, for determining the information parameter 912 and the uncertainty parameter 914.

To learn agent 110 trajectory z embeddings, a variational encoder q and decoder 930 architecture may be employed, and each agent 110 may employ an encoder q to compute a variational distribution which may be expressed according to Equation 1 below, which encodes the agents' 110 trajectory z information.

$$q(z|\tau_i^{1:t}, m_{i,rec}^t) = N(z; \mu, \text{diag}(\sigma)); \quad \text{Equation (1)}$$

The trajectory embeddings may be modelled by a diagonal Gaussian distribution as expressed by Equation 1, where z refers to the receiving agent's 118 trajectory in relation to a message 120 $m_{i,rec}^t$ received at a time t; $\tau_i^{1:t}$ refers to the evidence lower bound (ELBO) given trajectory of the receiving agent 118; the mean is $\mu \in \mathbb{R}^d$; the variance is $\sigma \in \mathbb{R}_+^d$; and the distribution over trajectory embeddings may be represented as N(z). In various embodiments, the encoder q may be implemented as a recurrent neural network that outputs $\mu$ and $\log(\text{diag}(\sigma))$. At each time t step, the encoder q may receive information about the trajectory z, including observations $o_{1:t}^i$ as well as the received messages 120 $m_{i,rec}^t$, and the information may used to update the trajectory embeddings N(z).

To train the encoder q, a decoder 930 that reconstructs the transition and reward functions, conditioned on trajectory embedding samples z~N(z)), may be employed. In various embodiments, both the encoder q and decoder 930 may be parameterized by parameters, $\phi$ and $\psi$ respectively, and may be configured to be optimized jointly to maximize the ELBO given trajectory $\tau_i^{1:t}$, which may be expressed by Equation (2) below.

$$ELBO(\phi, \psi|\tau_i^{1:t}, m_{i,rec}^t) = \quad \text{Equation (2)}$$
$$\mathbb{E}_{q(z^i|\tau_i^{1:t}, m_{i,rec}^t)}[\log p(o_i^{t+1}, r_i^t|o_i^t, z; \psi)] -$$
$$\beta KL(q(z|\tau_i^{1:t}, m_{i,rec}^t; \phi)\|p(z));$$

where $\rho$ refers to the agent's policies; $o_i^{t+1}$ refers to the receiving agent's 118 observation at the next timestep of t+1; $r_i^t$ refers to the receiving agent's reward at a time t; KL refers to the Kullback-Leibler (KL) divergence; and $\beta$ refers to an additional hyperparameter to control the regularization of the KL divergence.

The objective of determining the significance parameter 162 based on the information parameter 912 and uncertainty parameter 914 stored in the another processor 910 and trained by the ITE model, may be based on the idea that the significance parameter 162 of a message 120 may be distinguished by its specific transition and reward functions. Therefore, by modeling the decoder 930 as a multivariate Gaussian model over observations and rewards with a constant diagonal matrix and assuming a standard Gaussian prior, the ELBO may be maximized and accordingly, loss $\mathbb{L}_i$ in system 900 may be minimized. In various embodiments, the loss $\mathbb{L}_i$ may be expressed according to Equation (3) below, $$\mathbb{L}_i(\phi, \psi|\tau_i^{1:t}, m_{i,rec}^t) = \mathbb{E}_{q(z_t|\tau_i^{1:t}, m_{i,rec}^t;\phi)} \quad \text{Equation (3)}$$
$$[(\rho(o_i^{t+1}|o_t, z; \psi) - o_i^{t+1})^2 + (\rho(r_t|o_t, z; \psi) - r_t)^2] -$$
$$\beta \frac{1}{2}\sum_{j=1}^d (1 + \log(\sigma_j^2) - \mu_j^2 - \sigma_j^2).$$

In various embodiments, the processor 150 may determine the significance parameter 162 for each asynchronous message within the asynchronous category 152, and may further determine the significance parameter 162 of each synchronous message within the synchronous category 158. Based on said significance parameters 162, the processor 150 may determine an appropriate response strategy 178 comprising the response signals 172, 174, 176 to the set of messages 120 received by the receiving agent 118.

Figure 10:
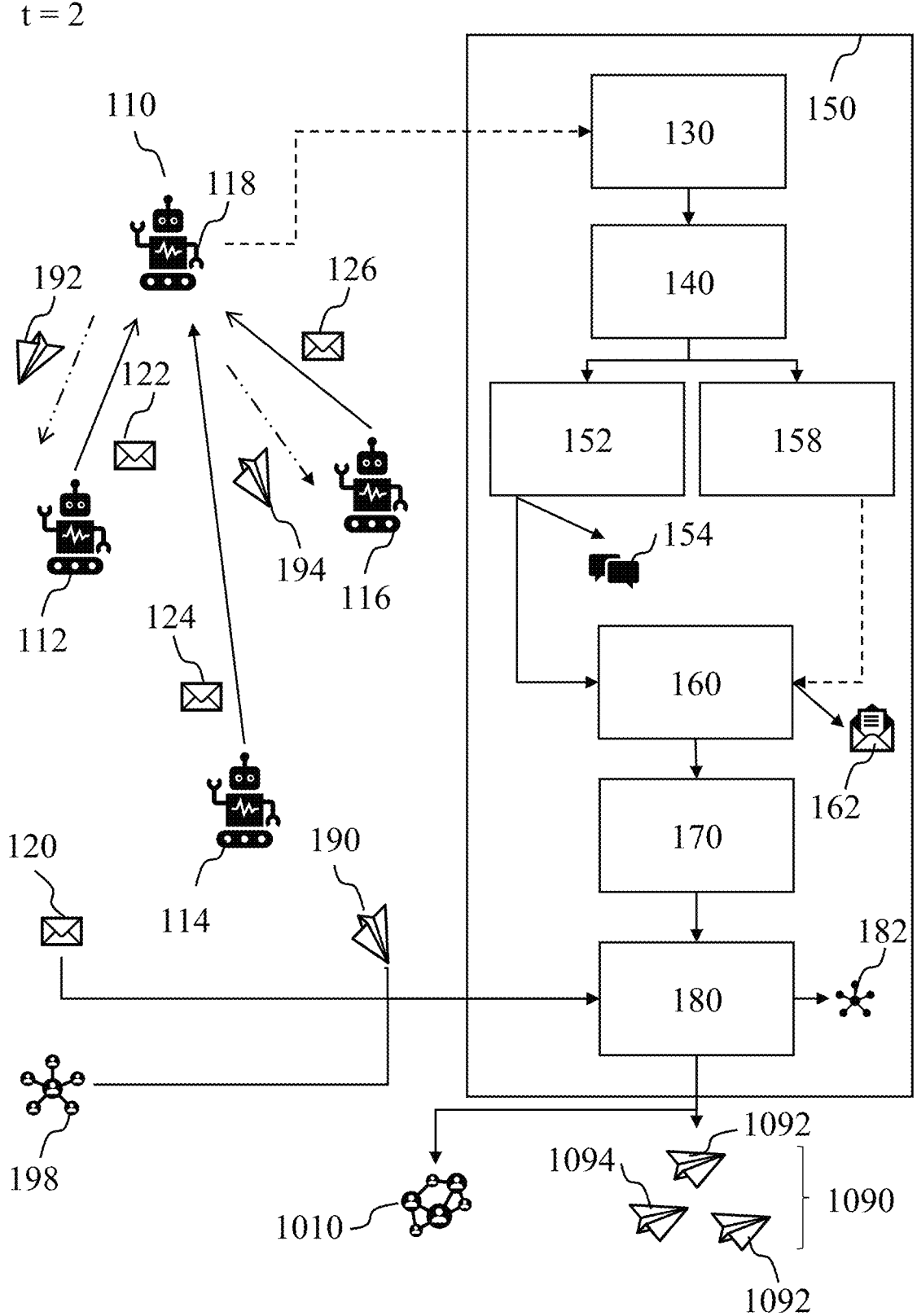
FIG. 10 show an exemplary schematic illustration of system 1000, where the processor 150 may be further configured to adapt 180 a communication topology 182 among the plurality of agents 110.

FIG. 10 show an exemplary schematic illustration of system 1000, where the processor 150 may be further configured to adapt 180 a communication topology 182 among the plurality of agents 110. System 1000 may be based on system 100 described with reference to FIG. 1 and repeated descriptions will be omitted for conciseness.

Referring to FIG. 10, the processor 150 may be further configured to adapt 180 the communication topology 182, at a pass timepoint, e.g. next timepoint t=2 of the timeline of the exchange of messages 120 among the plurality of agents 110. In various embodiments, the pass timepoint may be after the first timepoint for determining 170, the response strategy 178 to the set of messages 120 received by the receiving agent 118.

In various embodiments, the receiving agent 118 may receive any number of messages 120 from the other agents 110, e.g. first 112, second 114 and third 116 agents, and may further send one or more messages 190 to the other agents 110, e.g. first 112, second 114 and third 116 agents. For example, the receiving agent 118 may send a message 192 to the first agent 112, and may send another message 194 to the third agent 116. Since the number of messages 120 received and sent by an agent 110 may be dynamic, a constantly changing communication topology 182 among the plurality of agents 110 may result, and the receiving agent 118 may need to know who, how and what messages 120 are to be passed on to the other agents 110 at a subsequent timepoint, e.g. pass timepoint.

As shown in FIG. 10, the processor 150 may obtain, a number of received messages 120 within the set of messages 120, e.g. first 122, second 124 and third 126 received messages, and obtain, a number of sent messages 190, e.g. first sent 190, second sent 192 messages, sent by the receiving agent 118. In various embodiments, the processor 150 may further obtain a first mode parameter 198 indicative of a first mode in which the receiving agent 118 is receiving the set of messages 120 and sending the sent messages 190. In some embodiments, the first mode parameter 198 may be a first mode of a broadcast communication topology, where the agents 110 exchange messages 120, 190 by broadcasting the message 120, 190 to neighboring agents 110.

Based on the number of messages 120 received by the receiving agent 118, the number of messages sent 190 by said receiving agent 118, and/or the first mode parameter 198 indicative of the first mode in which the plurality of agents 110 may be communicating in, the processor 150 may be configured to determine, a set of messages 1090 that may be passed on to the other agents 110, at the subsequent, e.g. pass timepoint, t=2; and may further determine, the second mode parameter 1010 indicative of a second mode, in which the messages 1090 that may be passed on to the other agents 112, 114, 116, at the pass timepoint, e.g. t=2. In various embodiments, the second mode parameter 1010 may the same as, or may not be the same as the first mode parameter 198. For example, the processor 150 may determine that the second mode parameter 1010 may comprise a mixed communication topology, which may differ to the broadcast communication topology adopted in the first mode parameter 198.

Figure 11:
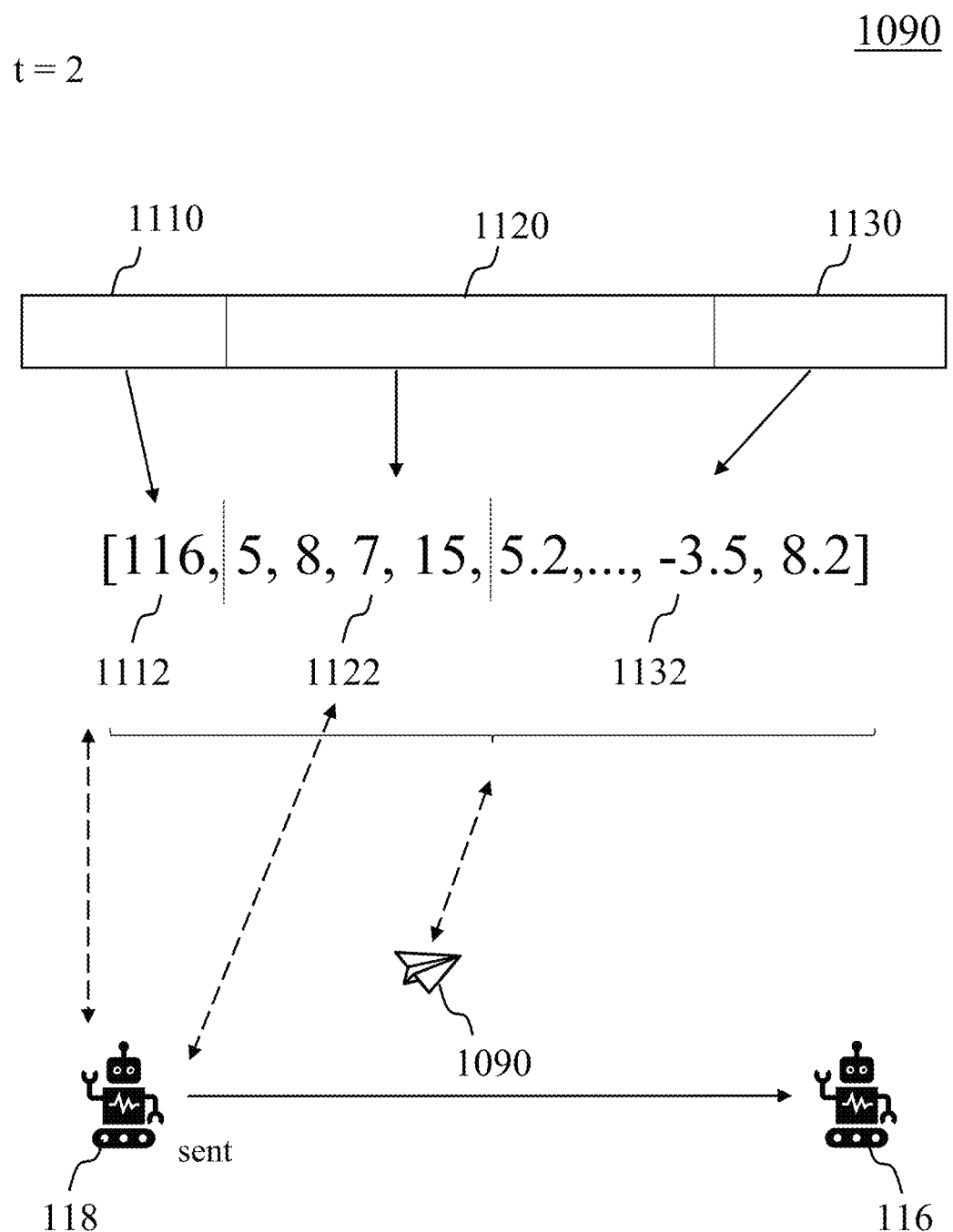
FIG. 11 shows an exemplary schematic illustration of a message 1090 type that may be passed on to at least one other agent 110 of the plurality of agents 110.

FIG. 11 shows an exemplary schematic illustration of a message 1090 type that may be passed on to at least one other agent 110 of the plurality of agents 110. Referring to FIGS. 10 and 11, the processor 150 may determine a sending identification parameter 1110 indicative of an identity 1112 of other agent 110, e.g. first 112, second 114, third 116 agent, in which the receiving agent 118 is to pass the message 1090 on to; and a sending content parameter 1130 indicative of the instruction 1132, that is to be passed on to the other agent 110, e.g. first 112, second 114, third 116 agent. As shown in FIG. 11, the message 1090 to be passed on may also include the sent vector timestamp 1120 indicative of a sent timepoint 1122, e.g. at the pass timepoint of t=2, that the message 1090 may be passed on to. In other words, based on the second mode parameter 1010, the sending identification parameter 1110, and the sending content parameter 1130, the communication topology 182 may be adapted 180, so that the receiving agent 118 is aware of who, how and what to communicate at the subsequent timepoint.

Figure 12:
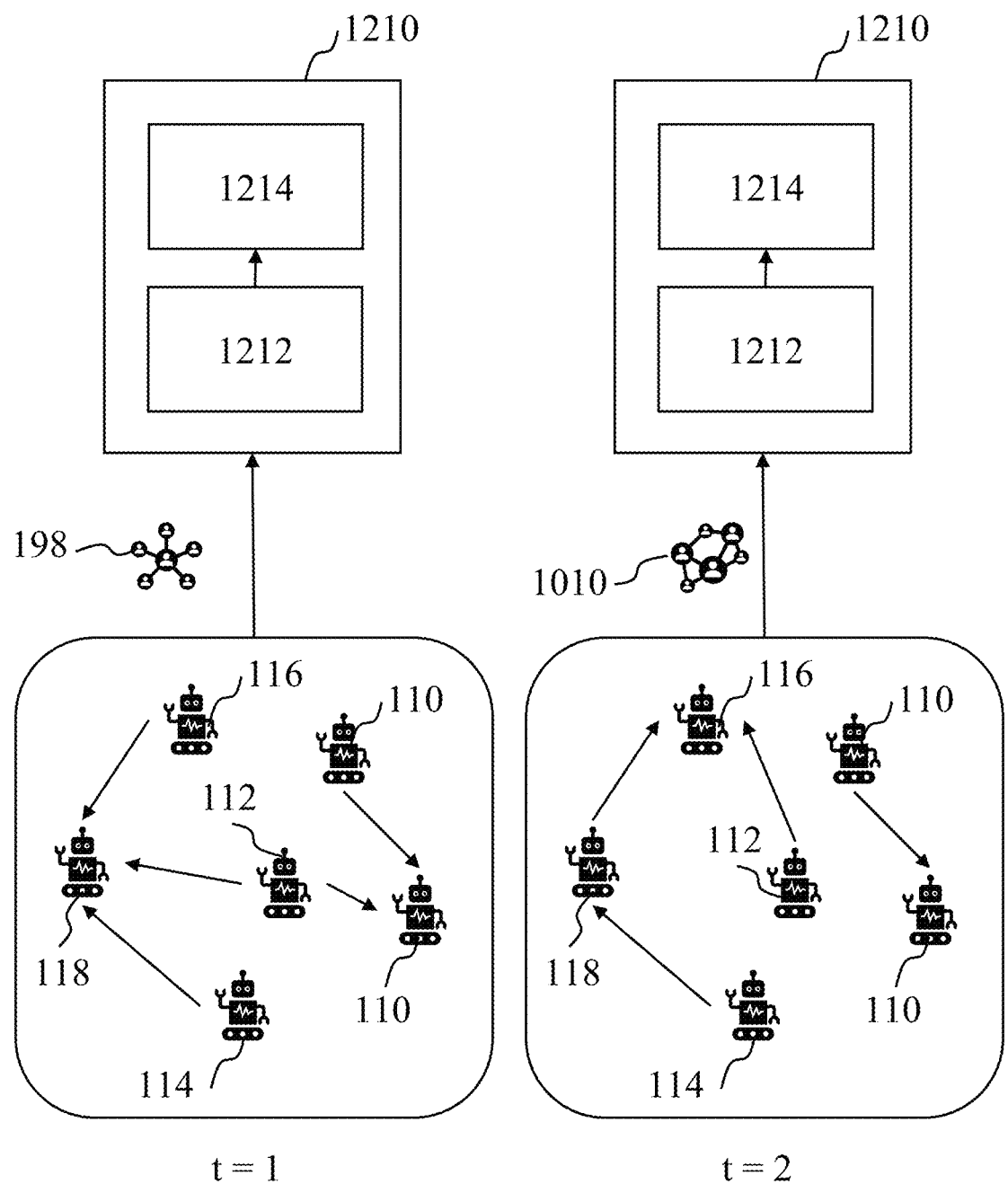
FIG. 12 shows an exemplary schematic illustration of a graph-based communication framework 1200, for adapting 180 the communication topology 182 for the receiving agent 118 to pass on the messages 1090 at the pass timepoint.

FIG. 12 shows an exemplary schematic illustration of a graph-based communication framework 1200, for adapting 180 the communication topology 182 for the receiving agent 118 to pass on the messages 1090 at the pass timepoint.

Referring to FIGS. 10 to 12, the graph-based communication framework 1200 may be in data communication with the processor 150 of the system 1000 (not shown). Since the messages 120 source and the number of messages 120 received by the receiving agent 118 may be dynamic, the graph-based communication framework 1200 may include another processor 1210, comprising a message passing (MP) neural network for adapting 180 the communication topology 182 at the pass timepoint, e.g. t=2, for handling of the dynamic communication topology 182.

Referring to FIG. 12, the another processor 1210 comprising the message passing neural network may include two components, a graph convolutional network (GCN) 1212, followed by a recurrent neural network (RNN) 1214, and each agent 110 may be treated as a node. In the Equations below, the other agent's sending the message 120 to the receiving agent 118, e.g. agent i, may also be referred to as agent j.

In various embodiments, the MP neural networks may be expressed according to Equation (4) below, $$x_i^{(k)} = \gamma^k\left(x_i^{(k-1)}, \boxdot_{j \in N(i)\phi(k)}\left(x_i^{(k-1)}, x_j^{(k-1)}, e_{j,i}\right)\right); \quad \text{Equation (4)}$$

where $x_j^{(k-1)} \in \mathbb{R}^F$ denotes node features of node i in layer (k−1); $e_{j,i} \in \mathbb{R}^D$ denotes optional edge features from node j to node i; $\boxdot$ denotes a differentiable, permutation invariant function, e.g. sum, mean or max, and $\gamma$ and denote differentiable functions such as Multi-Layer Perceptrons (MLPs). In the implementation, $x_j^{(0)} = m_{j,i}$ and select mean as the permutation invariant function, and the features of the last layers may be fed into the RNN 1214 to capture the dynamic caused by the dynamic communication topology 182, such that the communication topology 182 may be adapted 180 at the next pass timepoint, e.g. t=2.

In various embodiments, the second mode parameter 1010, the identity parameter 1110, and the sending content parameter 1130, may be transmitted to the another processor of the receiving agent 118, to enable the receiving agent 118 to know who, how and what message 1090 to pass on to at the pass, e.g. next timepoint t=2.

According to another aspect of the disclosure, there is provided a distribution facility comprising the system 100, 900, 1000 described with reference to FIGS. 1 and 3 to 12.

Figure 13:
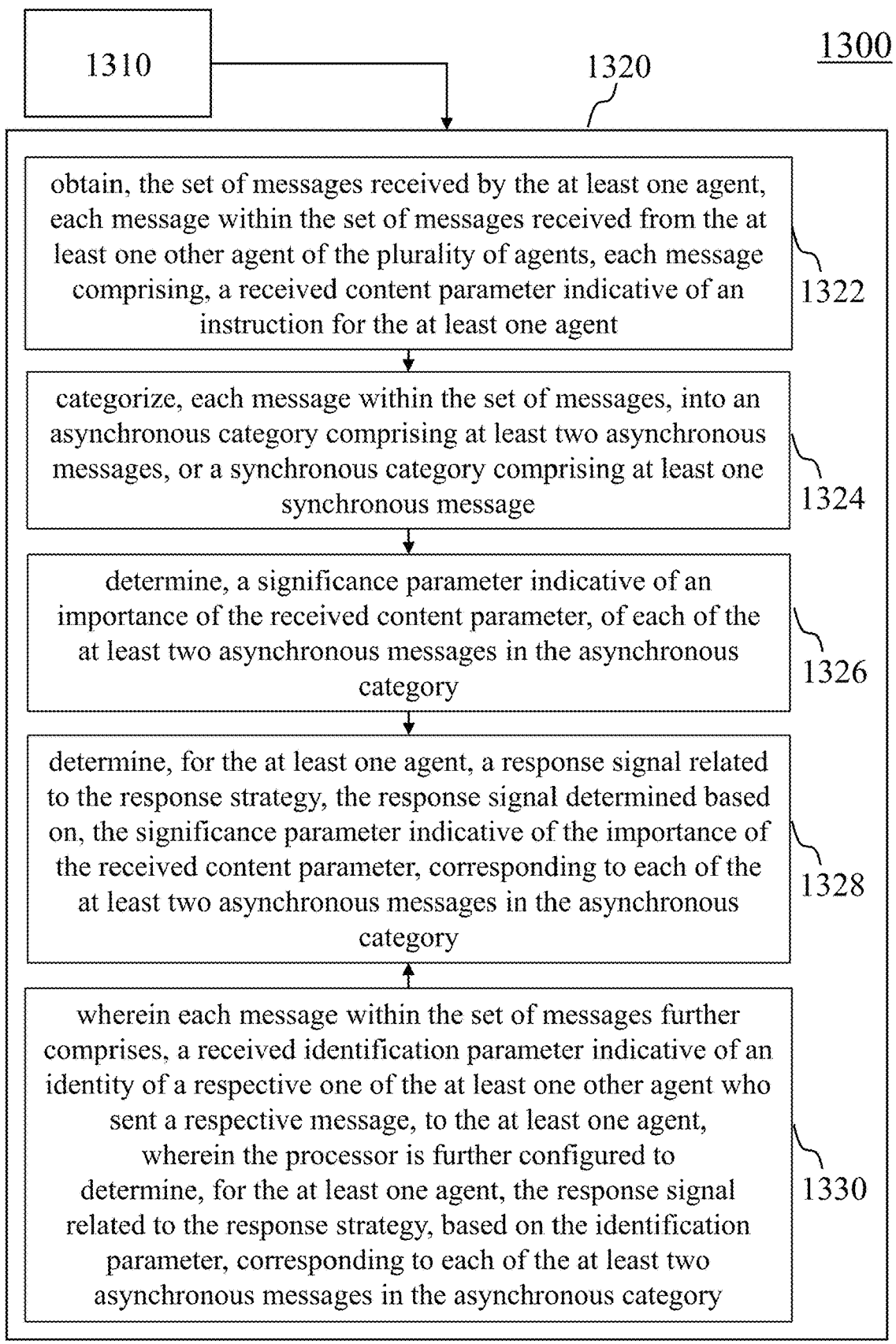
FIG. 13 shows an exemplary schematic illustration of a control device 1300 comprising a processor 1310 configured to determine, a response strategy to a set of messages received by at least one agent.

FIG. 13 shows an exemplary schematic illustration of a control device 1300 comprising a processor 1310 configured to determine, a response strategy to a set of messages received by at least one agent, in accordance with another aspect of the disclosure. The control device 1300 may be configured for system 100, 900, 1000 described with reference to FIGS. 1 and 3 to 12, and repeated descriptions are omitted for brevity.

Referring to FIG. 13, the control device 1300 includes a processor 1310 in data communication with a memory 1320 having instructions stored therein, the instructions, when executed by the processor 1310, causes the processor 1310 to: obtain, the set of messages received by the at least one agent, each message within the set of messages received from the at least one other agent of the plurality of agents, each message comprising, a received content parameter indicative of an instruction for the at least one agent (step 1322); categorize, each message within the set of messages, into an asynchronous category comprising at least two asynchronous messages, or a synchronous category comprising at least one synchronous message (step 1324); determine, a significance parameter indicative of an importance of the received content parameter, of each of the at least two asynchronous messages in the asynchronous category (step 1326); and determine, for the at least one agent, a response signal related to the response strategy, the response signal determined based on, the significance parameter indicative of the importance of the received content parameter, corresponding to each of the at least two asynchronous messages in the asynchronous category (step 1328).

In various embodiments, each message within the set of messages further comprises, a received identification parameter indicative of an identity of a respective one of the at least one other agent who sent a respective message, to the at least one agent; and the processor 1310 may further: determine, for the at least one agent, the response signal related to the response strategy, based on the identification parameter, corresponding to each of the at least two asynchronous messages in the asynchronous category (step 1330).

Figure 14:
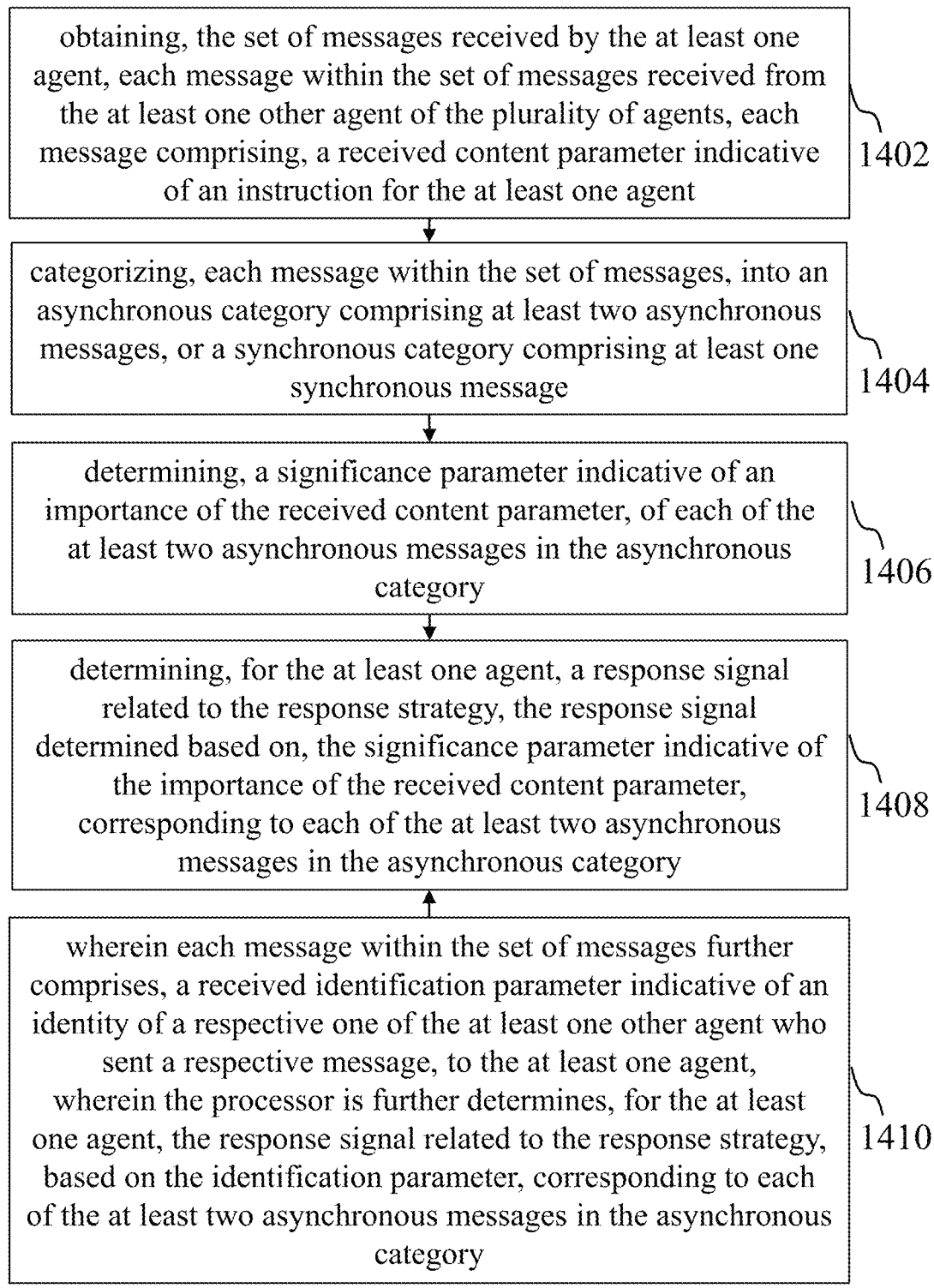
FIG. 14 shows an exemplary flowchart of a method 1400 for determining, a response strategy to a set of messages received by at least one agent.

FIG. 14 shows an exemplary flowchart of a method 1400 for determining, a response strategy to a set of messages received by at least one agent, in accordance with another aspect of the disclosure. The method 1400 may be configured for operating the system 100, 900, 1000 described with reference to FIGS. 1 and 3 to 12 of the disclosure, and repeated descriptions are omitted for brevity.

Referring to FIG. 14, the method 1400 includes providing a processor for executing the following steps of: obtaining, the set of messages received by the at least one agent, each message within the set of messages received from the at least one other agent of the plurality of agents, each message comprising, a received content parameter indicative of an instruction for the at least one agent (step 1402); categorizing, each message within the set of messages, into an asynchronous category comprising at least two asynchronous messages, or a synchronous category comprising at least one synchronous message (step 1404); determining, a significance parameter indicative of an importance of the received content parameter, of each of the at least two asynchronous messages in the asynchronous category (step 1406); and determining, for the at least one agent, a response signal related to the response strategy, the response signal determined based on, the significance parameter indicative of the importance of the received content parameter, corresponding to each of the at least two asynchronous messages in the asynchronous category (step 1408).

In various embodiments, each message within the set of messages further comprises, a received identification parameter indicative of an identity of a respective one of the at least one other agent who sent a respective message, to the at least one agent, and the processor may further execute the step of: determines, for the at least one agent, the response signal related to the response strategy, based on the identification parameter, corresponding to each of the at least two asynchronous messages in the asynchronous category (step 1410).

In various embodiments, each agent may comprises, a local vector clock having a plurality of elements corresponding to a number of agents of the plurality of agents, each element comprising an event parameter indicative of one or more corresponding events related to a respective agent of the plurality of agents; and each message within the set of messages may comprises, a sent vector timestamp indicative of a second timepoint when the message was sent, the sent vector timestamp corresponding to the local vector clock of the respective one of the at least one other agent, who sent the respective message. In method 1400, the processor may further execute the steps of: comparing, the sent vector timestamp of each message within the set of messages, with the local vector clock of the at least one agent; and categorizing, each message within the set of messages, into the asynchronous category comprising the at least two asynchronous messages, or the synchronous category comprising the at least one synchronous message, based on the comparison of the sent vector timestamp of each message within the set of messages, with the local vector clock of the at least one agent.

According to another aspect of the disclosure, there is provided a computer readable medium comprising instructions, which when executed by the processor, causes the processor to perform the method 1400 described with reference to FIG. 14.

Embodiments of the disclosure thus provides an improved system 100, 900, 1000 which allows agents 110 to communicate with one another with realistic time delay, characteristic in asynchronous communication MARL systems. The inventors have demonstrated, through numerical experiments on multi-particle environments, e.g. RWARE 1500 and LBF 1600 environments, the effectiveness of the improved system 100, 900, 1000. Accordingly, the improved system 100, 900, 1000 enables agents to cooperate with a good trade-off between the benefit of communication and cost of delayed messages.

Examples

The system 100, 900, 1000 and method 1400 herein disclosed are further illustrated in the following examples, which are provided by way of illustration and are not intended to be limiting the scope of the present disclosure.

In the Examples, the system 100, 900, 1000 and method 1400 (also referred to as AGICom) are evaluated to demonstrate the performance of AGICom. To this end, the inventors employed the use of a multi-robot warehouse (RWARE), and level-based foraging (LBF) environments, with the objective of determining whether: (i) delayed communication affects multi-agent 110 cooperation; (ii) if AGICom is able to handle asynchronous communication; and (iii) which parts of AGICom are essential. Briefly, AGICom was evaluated against conventional MARL systems, namely the Independent Proximal Policy Optimization (IPPO; de Witt et al., Is independent learning all you need in the StarCraft multi-agent challenge, *arXiv preprint arXiv:* 2011.09533; 2020), and Deep Grid Net (DGN; Jiang et al., Learning attentional communication for multi-agent cooperation, *Advances in neural information processing systems*, 31, 2018) algorithms, and the following approaches as shown in Table 1 below were evaluated.

TABLE 1

Baseline Algorithms

| Categories | Methods |
| --- | --- |
| Syn + MARL | Syc + IPPO |
| | Asyc + IPPO |
| Graph-based | Asyc + DGN |
| | Asyc + AGICom |
| Ablation Study | AGICom without MP |
| | AGICom without ITE |

To conduct the experiments, the environment was first modified to enable asynchronous communication. Specifically, the speed of message broadcast was set to be double the moving speed of the agent 110 and a small amount of noise was added to the arrival time. In the Examples, the modified environments are referred to as asynchronous environments and abbreviated as Asyc. In comparison, the Asyc environment was compared against the synchronous environment, which is abbreviated as Syc.

Next, the inventors modified the IPPO algorithm by incorporating the capability to receive all receivable messages as part of the observations. This modification was done to investigate the impact of asynchronicity on agent 110 cooperation. The inventors further selected the state-of-the-art conventional graph-based MARL method, the DGN algorithm as a baseline for comparison, as DGN focuses on applying graph-based models to value decomposition within the context of counterfactual multi-agent deep deterministic policy gradients (CTDE), while AGICom applies graph-based models to handle asynchronous messages.

Lastly, ablation studies were conducted to investigate the effect of the ITE algorithm and the MP module on the performance of the AGICom algorithm.

Environments

Figure 15:
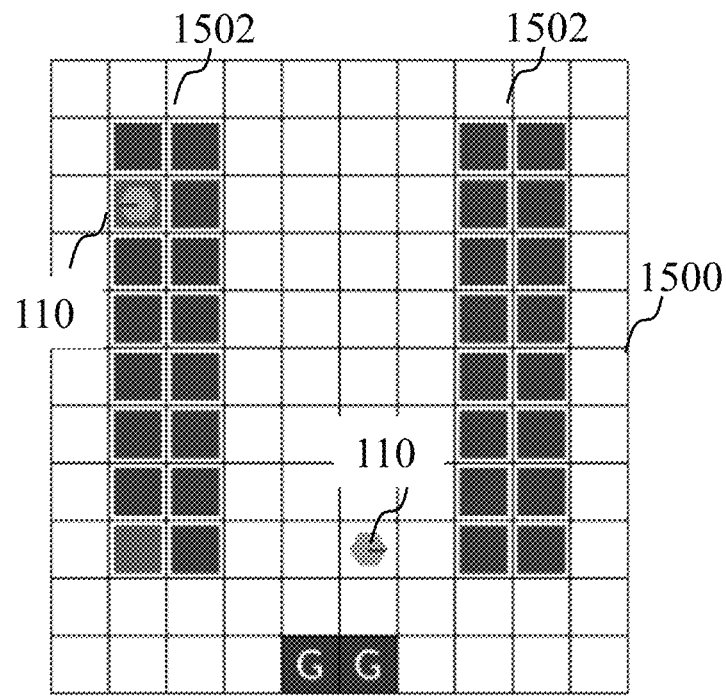

RWARE: FIG. 15 shows an exemplary schematic illustration of a RWARE environment 1500 on which AGICom was evaluated on. In the RWARE environment 1500, the agents 110 must gather and transport items 1502 from shelves within the warehouse. They have a limited view of their surroundings, represented as a 5×5 grid, which includes information about nearby shelves, other agents 110, and delivery locations. The agents 110 can move forward, pick up items, and rotate, which also changes their field of view. The task includes scenarios with two or four agents 110 and different warehouse layouts, creating varied challenges that necessitate the adaptation of coordination strategies, as shown in FIG. 15. The training and evaluation sets encompass multiple warehouses with similar designs but varying dimensions. Each episode lasts for 500 timesteps.

Figure 16:
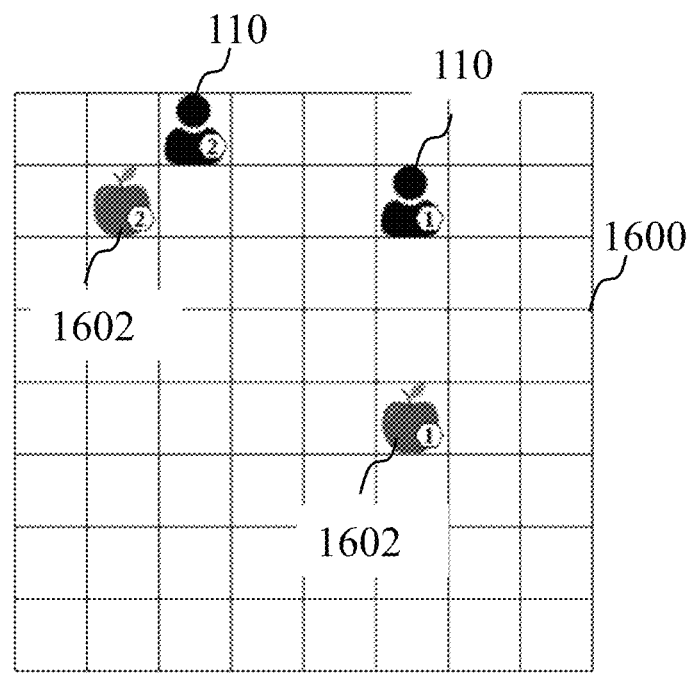

LBF environment: FIG. 16 shows an exemplary schematic illustration of a LBF environment 1600 on which AGICom was evaluated on. In the LBF environment 1600, multiple agents 110 must work together in a grid-like environment to collect food 1602. Food 1602 and agents 110 are assigned levels, and agents 110 can only collect food 1602 that is adjacent to them if the sum of the levels of all agents 110 working together is equal to or greater than the level of the food 1602. The agents 110 can see a 5×5 grid around themselves and they are rewarded based on the level of the food 1602 they collect and their contribution to the task. The scenarios end when all the food 1602 has been collected or after 50 timesteps. Agents 110 were trained on two simple LBF tasks that have grid worlds of 8×8 and involve two or four agents 110. The testing tasks for two and four agents 110 include a task with a grid world of 10×10 where each food 1602 item will require at least two agents 110 to work together, tasks with larger grid worlds of 15×15, and tasks where there is a small penalty for unsuccessful attempts to collect food 1602.

Experimental Setup

Figure 17:
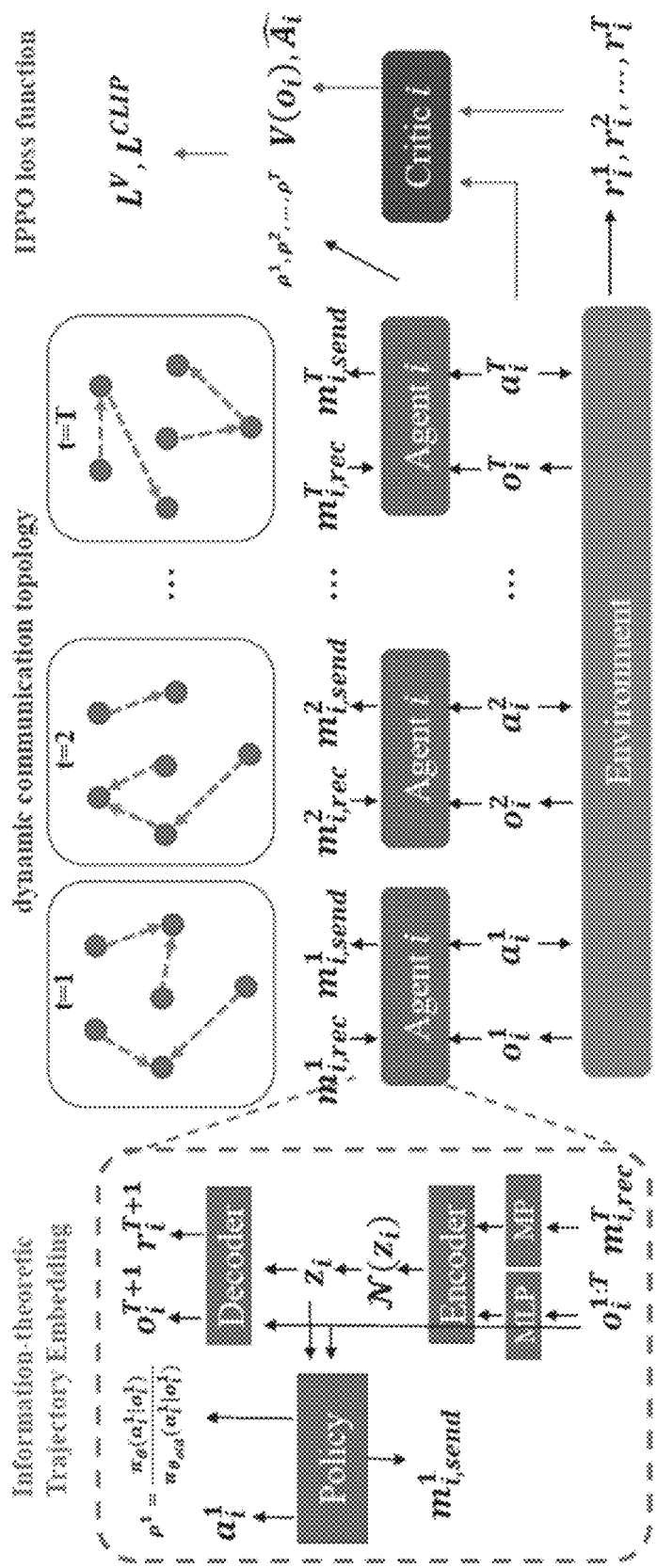
FIG. 17 shows the architecture of AGICom from the perspective of a trained receiving agent 118 (also referred to as agent i), for determining the response strategy 178 to a set of messages 120 received.

FIG. 17 shows the architecture of AGICom from the perspective of a trained receiving agent 118 (also referred to as agent i), for determining the response strategy 178 to a set of messages 120 received.

Training: The AGICom model was trained with an ADAM optimizer of a 5e-4 learning rate, $\beta 1=0.9$ and $\beta 2=0.999$, without weight decay, gradient clip 0.5, and batch size 2048. Also, the parallel environments were set as 10. Two different tasks with different sizes of the map in the two environments were selected.

In various embodiments, the inventors employed the use of IPPO as the basic algorithm, and each agent 110 was trained independently and with non-shared parameters.

Policy Updates: In order to avoid training instability in the large-scale distributed environments, the inventors employed the use of the dual-clip Proximal Policy Optimization (PPO; Schulman et al., Proximal policy optimization algorithms, arXiv preprint arXiv: 1707.06347, 2017) method for each agent 110. Unlike the original algorithm, the inventors introduced policy $\pi_\theta (a_i|o_i)$, and the estimate of the advantages $A^\wedge_t(a_i, o_i)$. Thus, when policy $\pi_\theta (a_i|o_i)$ is much greater than, i.e. >>, $\pi_{\theta,old}(a_i|o_i)$, and $A^\wedge_t<0$, the ratio $r^t(\theta)$ expressed according to Equation (5) below, is huge.

$$r^t(\theta) = \frac{\pi_\theta(a_i|o_i)}{\pi_{\theta,old}(a_i|o_i)}. \qquad \text{Equation (5)}$$

This causes the large and unbounded variance since $r^t(\theta) A^\wedge_t<<0$. Dual-clip PPO introduces another clipping parameter c that indicates the lower bound when $A^\wedge_t<0$. The new objective may therefore be defined by Equation (6) below, $$L_i^{CLIP}(\theta) = \qquad \text{Equation (6)}$$
$$\mathbb{E}^\wedge_t [\max(cA^\wedge_t, \min(clip(r^t(\theta), 1-\tau, 1+\tau)A^\wedge_t, r^t(\theta)A^\wedge_t)];$$

where τ is the original clip parameter in PPO.

Value Updates: Using the PPO value function approximation, the value loss may therefore be defined according to Equation (7) below, $$L_i^V(\theta) = \mathbb{E}^\wedge_t [R_i^t - V^\wedge_i^t]; \qquad \text{Equation (7)}$$

where $R_i^t$ is the return and $V^\wedge_i^t$ is the estimated value. Accordingly, the overall loss function may be expressed according to Equation (8) below, $$L_i = L_i^{CLIP}(\theta) + L_i^V(\theta) + L_i\left(\phi, \psi|\tau_i^{1:t}, m_{i,rec}^t\right); \qquad \text{Equation (8)}$$

Metrics: Episodic returns as the sum of episodic returns of all agents 110 was reported. The inventors trained and fine-tuned each algorithm for 5 random seeds and reported the interquartile mean (IQM) standard deviation across returns over all seeds. Learning curves with IQM and stratified bootstrap 95% confidence intervals were computed over 5 random seeds. For more readability, the inventors employed the use of the exponential smoothing function, which is used by TensorBoard, to reduce too much noise on the curve, since each trial runs for 50 million steps.

Results

The inventors conducted experiments to compare the performance of two different algorithms, Syc+IPPO and Asyc+IPPO, in two different environments, the RWARE environment 1500 and the LBF environment 1600.

Figure 18:
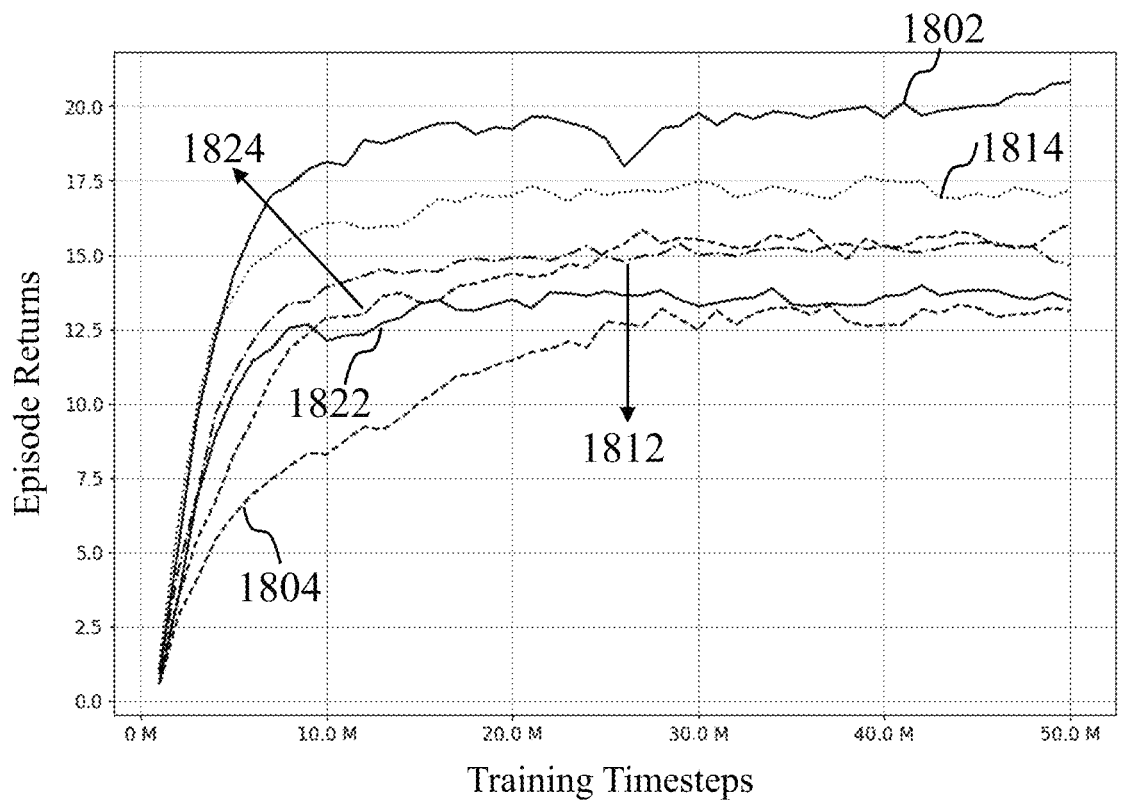
FIG. 18 shows the evaluation performance 1800 of various methods on RWARE environment 1500 tiny 4 agents.
Figure 19:
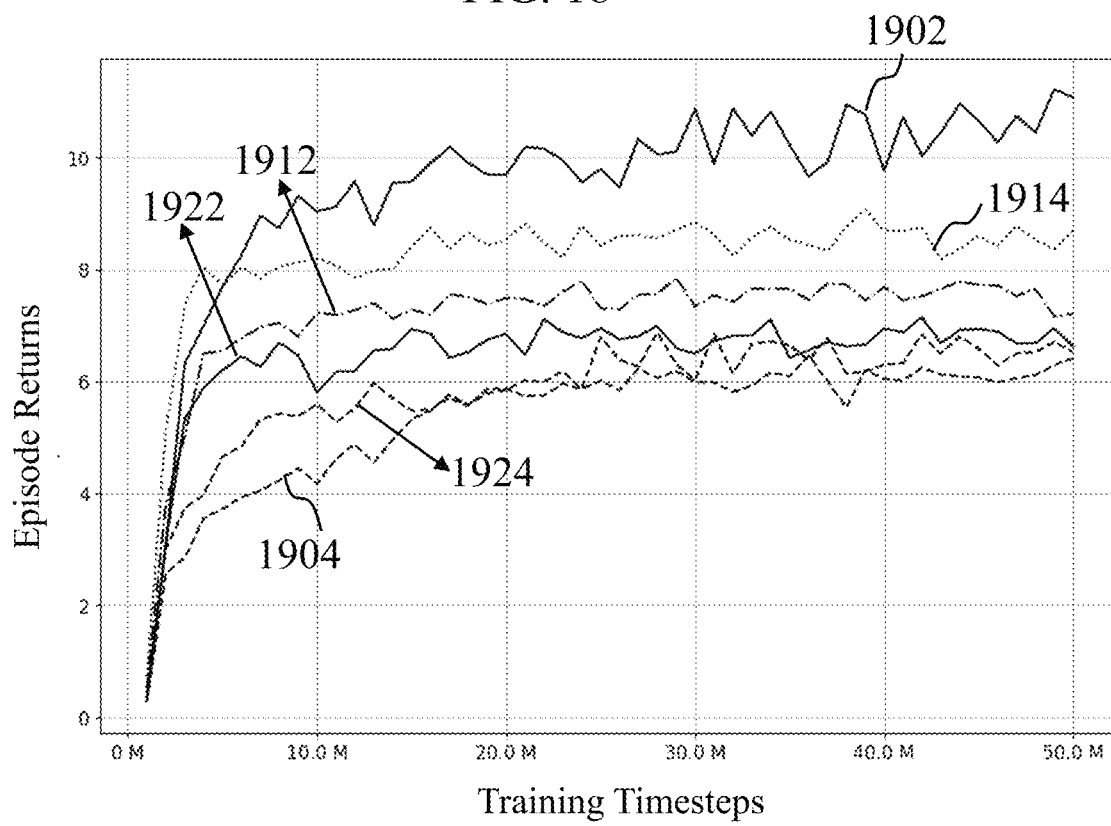
FIG. 19 shows the evaluation performance 1900 of various methods on RWARE environment 1500 small 4 agents.

FIG. 18 shows the evaluation performance 1800 of various methods on RWARE environment 1500 tiny 4 agents. FIG. 19 shows the evaluation performance 1900 of various methods on RWARE environment 1500 small 4 agents. In FIGS. 18 and 19, labels 1802 and 1902 may refer to the Syc+IPPO result respectively; label 1804 and 1904 may refer to the Asyc+IPPO result respectively, label 1812 and 1912 may refer to the Asyc+DGN result respectively, label 1814 and 1914 may refer to the Asyc+AGICom result respectively, label 1822 and 1922 may refer to the AGICom without the ITE module respectively, and label 1824 and 1924 may refer to the AGICom without the MP module respectively.

Figure 20:
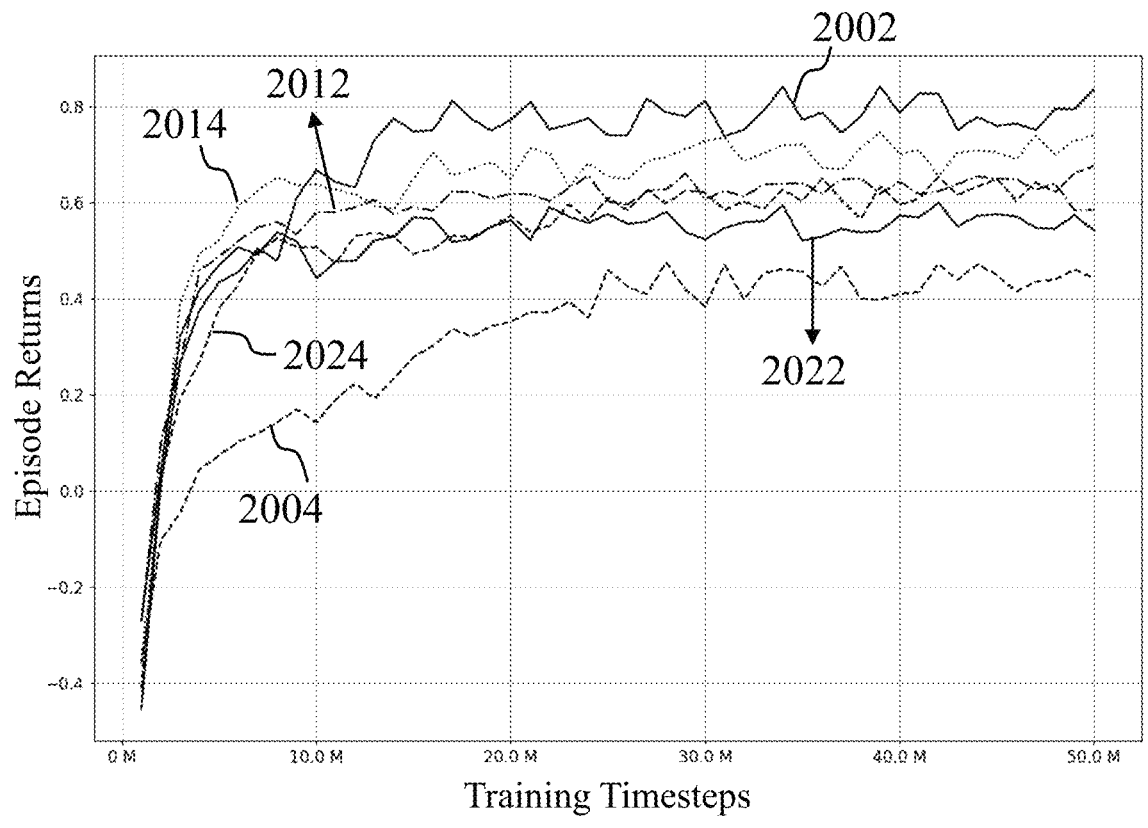
FIG. 20 shows the evaluation performance 2000 of various methods on LBF environment 1600 8×8 grid.
Figure 21:
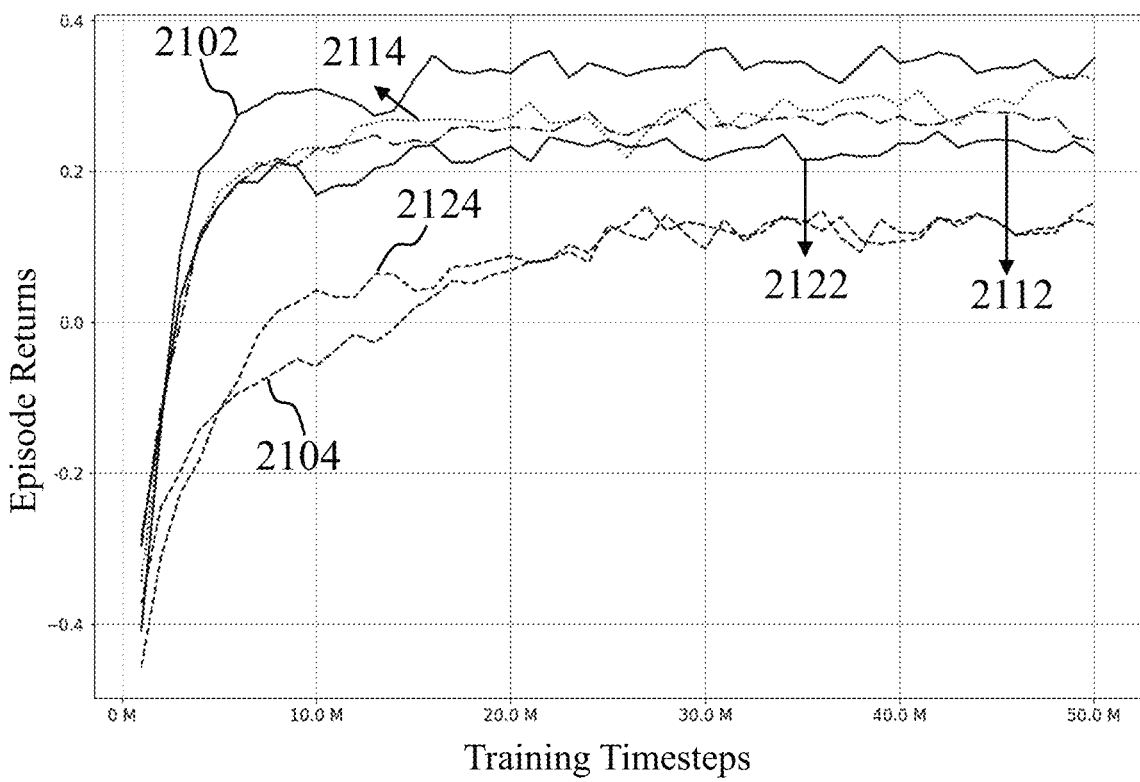
FIG. 21 shows the evaluation performance 2100 of various methods on LBF environment 1600 15×15 grid.

FIG. 20 shows the evaluation performance 2000 of various methods on LBF environment 1600 8×8 grid. FIG. 21 shows the evaluation performance 2100 of various methods on LBF environment 1600 15×15 grid. In FIGS. 20 and 21, label 2002 and 2102 may refer to the Syc+IPPO result respectively, label 2004 and 2104 may refer to the Asyc+IPPO result respectively, label 2012 and 2112 may refer to the Asyc+DGN result respectively, label 2014 and 2114 may refer to the Asyc+AGICom result respectively, label 2022 and 2122 may refer to the AGICom without the ITE module respectively, and label 2024 and 2124 may refer to the AGICom without the MP module respectively.

1. The Necessity of Dealing with Asynchronicity

Referring to FIGS. 18 to 21, the results showed that Syc+IPPO (labels 1802, 1902, 2002, 2102) performed significantly better than Asyc+IPPO (labels 1804, 1904, 2004, 2104). The only difference between the two algorithms is the level of synchrony in the communication between agents 110. These results support the idea that in asynchronous communication, delays in message transmission can lead to suboptimal cooperation, particularly in tasks involving cooperative navigation.

B. Performance

The performance of two other algorithms, Asyc+DGN (labels 1812, 1912, 2012, 2112) and Asyc+AGICom (labels 1814, 1914, 2014, 2114), in both RWARE 1500 and LBF 1600 environments are also compared.

Referring to FIGS. 18 to 21, it is observed that Syc+IPPO (labels 1802, 1902, 2002, 2102) still achieved the best performance among all algorithms, as expected, since the synchronous communication allows agents 110 to receive the broadcasted information immediately, avoiding any information loss. However, when comparing Asyc+AGICom (labels 1814, 1914, 2014, 2114) and Asyc+DGN (labels 1812, 1912, 2012, 2112), Asyc+AGICom (labels 1814, 1914, 2014, 2114) performed better in the RWARE environment 1500, but the difference was not as significant in the LBF environment 1600. This is because the LBF environment 1600 requires more communication between agents 110 compared to RWARE environment 1500, as agents 110 only receive rewards for successfully collecting food 1602, and the level of the collected food 1602 determines the reward. As a result, agents 110 in the LBF environment 1600 need to exchange not only the position and collection status of food 1602, but also its level information, while agents 110 in RWARE environment 1500 only need to exchange position and collection status.

C. Ablation Study

To determine why AGICom is robust in asynchronous communication and delayed transmission, the inventors tested the effect of removing the sent vector timestamp 420 and the MP module on the performance of AGICom. The inventors compared the results of AGICom with the ITE module removed, i.e. AGICom without ITE (labels 1822, 1922, 2022, 2122) and AGICom with the MP module replaced by an average module, i.e. AGICom without MP (labels 1824, 1924, 2024, 2124).

Referring to FIGS. 18 to 21, the results showed that in the RWARE tiny environment 1500, AGICom without MP (labels 1824, 1924, 2024, 2124) performed slightly better than AGICom without ITE (labels 1822, 1922, 2022, 2122), while in the RWARE small environment 1500, AGICom without ITE (labels 1822, 1922, 2022, 2122) performed slightly better than AGICom without MP (labels 1824, 1924, 2024, 2124). The LBF environment 1600 also showed similar results.

This suggests that in larger environments, when there is noise on the arriving time of messages 120, the communication is more easily affected, and the ITE module is like a weight adjuster to determine the importance of the received messages 120. The MP module, on the other hand, is crucial for avoiding causality violations.

While the disclosure has been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

The invention claimed is:

1. A system comprising:
    a memory storing instructions; and
    a processor coupled to the memory, the processor being configured to execute the instructions to:
        obtain a set of messages received by at least one agent of a plurality of agents, wherein each message of the set of messages is received from at least one other agent of the plurality of agents and includes a received content parameter indicative of an instruction for the at least one agent;
        categorize each message of the set of messages into an asynchronous category comprising at least two asynchronous messages or a synchronous category comprising at least one synchronous message;
        determine a significance parameter indicative of an importance of the received content parameter of each of the at least two asynchronous messages; and
        determine, for the at least one agent, a response signal related to a response strategy, the response signal determined based on the significance parameter of each of the at least two asynchronous messages.

2. The system of claim 1, wherein each message of the set of messages further comprises a received identification parameter indicative of an identity of the at least one other agent, and the response signal is further based on the received identification parameter corresponding to each of the at least two asynchronous messages.

3. The system of claim 2, wherein each agent of the plurality of agents comprises a local vector clock having a plurality of elements corresponding to a number of agents of the plurality of agents, each element of the plurality of elements comprising an event parameter indicative of one or more corresponding events related to a respective agent of the plurality of agents;
 wherein each message of the set of messages further comprises a sent vector timestamp indicative of a sent timepoint of when the message was sent, the sent vector timestamp corresponding to the local vector clock of the respective one of the at least one other agent;
 wherein the processor is further configured to:
  compare the sent vector timestamp of each message of the set of messages with the local vector clock of the at least one agent;
  wherein categorizing each message of the set of messages into the asynchronous category comprising the at least two asynchronous messages or the synchronous category comprising the at least one synchronous message is based on the comparison.

4. The system of claim 3, wherein to compare the sent vector timestamp of each message of the set of messages with the local vector clock of the at least one agent, the processor is further configured to:
 compare at least one element in the sent vector timestamp to a corresponding at least one element in the local vector clock of the at least one agent;
determine for each message of the set of messages, whether the at least one element in the sent vector timestamp is less than the corresponding at least one element in the local vector clock; and
 categorize a message of the set of messages as an asynchronous message within the asynchronous category, if it is determined that the at least one element in the sent vector timestamp is less than the corresponding at least one element in the local vector clock of the at least one agent.

5. The system of claim 4, wherein the processor is further configured to:
 determine, for each message of the set of messages, whether the at least one element in the sent vector timestamp is equal to the corresponding at least one element in the local vector clock of the at least one agent; and
 categorize another message of the set of messages as a synchronous message within the synchronous category, if it is determined that the at least one element in the sent vector timestamp is equal to the corresponding at least one element in the local vector clock of the at least one agent.

6. The system of claim 2, wherein the processor is further configured to:
 determine, for the at least two asynchronous messages in the asynchronous category, an ordering parameter indicative of an order in which the at least two asynchronous messages were sent to the at least one agent by the respective at least one other agent.

7. The system of claim 6, wherein the ordering parameter comprises an earlier order of a first asynchronous message relative to a second asynchronous message, the first asynchronous message and the second asynchronous message being within the asynchronous category;
 wherein to determine the ordering parameter, the processor is further configured to:
  compare, at least one element in a sent vector timestamp of the first asynchronous message, to a corresponding at least one element in a sent vector timestamp of the second asynchronous message,
  determine whether the at least one element in the sent vector timestamp of the first asynchronous message is less than the corresponding at least one element in the sent vector timestamp of the second asynchronous message, and
  determine the earlier order of the first asynchronous message relative to the second asynchronous message, if it is determined that the at least one element in the sent vector timestamp of the first asynchronous message is less than the corresponding at least one element in the sent vector timestamp of the second asynchronous message.

8. The system of claim 6, wherein the ordering parameter comprises a concurrent order of a first asynchronous message and a second asynchronous message, wherein to determine the ordering parameter, the processor is further configured to:
 compare at least one element in a sent vector timestamp of the first asynchronous message to a corresponding at least one element in a sent vector timestamp of the second asynchronous message;
 determine whether the at least one element in the sent vector timestamp of the first asynchronous message is less than the corresponding at least one element in the sent vector timestamp of the second asynchronous message, and the at least one element in the sent vector timestamp of the first asynchronous message is greater than the corresponding at least one element in the sent vector timestamp of the second asynchronous message, and
 determine the concurrent order of the first asynchronous message and the second asynchronous message, if it is determined that the at least one element in the sent vector timestamp of the first asynchronous message is less than the corresponding at least one element in the sent vector timestamp of the second asynchronous message, and the at least one element in the sent vector timestamp of the first asynchronous message is greater than the corresponding at least one element in the sent vector timestamp of the second asynchronous message.

9. The system of claim 6, wherein the response signal is further based on the ordering parameter.

10. The system of claim 1, wherein the processor is further configured to:
 determine at least one of a number of messages of the set of messages received by the at least one agent, a number of messages of the set of messages sent by the at least one agent, and a first mode parameter indicative of a first mode in which the at least one agent is receiving the set of messages and sending at least one message of the set of messages; and
 adapt a communication topology between the at least one agent and the at least one other agent at a pass timepoint indicative of a time in which the at least one message is to be passed on to the at least one other agent, based on at least one of the number of messages received by the at least one agent, and the number of messages sent by the at least one agent.

11. The system of claim 10, wherein to adapt the communication topology between the at least one agent and the at least one other agent, the processor is further configured to:
 determine a sending identification parameter indicative of an identity of the at least one other agent the at least one message is to be passed on to at the pass timepoint;

determine a sending content parameter indicative of an instruction of the at least one message that is to be passed on to the at least one other agent at the pass timepoint; and determine a second mode parameter indicative of a second mode, in which the at least one message is to be passed on to the at least one other agent at the pass timepoint;

wherein adapting the communication topology is further based on at least one of the sending identification parameter, the sending content parameter, and the second mode parameter.

12. The system of claim 1, wherein to determine the significance parameter, the processor is further configured to:

obtain an information parameter indicative of information about the instruction, for the at least one agent; and obtain an uncertainty parameter indicative of a measure of an uncertainty of the instruction, for the at least one agent;

wherein determining the significance parameter is further based on at least one of the information parameter, and the uncertainty parameter.

13. The system of claim 1, wherein the response signal causes the at least one agent to:

execute the instruction contained in the received content parameter of one of the at least two asynchronous messages, or not execute the instruction contained in the received content parameter of one of the at least two asynchronous messages.

14. The system of claim 1, wherein the plurality of agents each comprise a second processor, and wherein the processor is further configured to:

transmit the response signal to the second processor of the at least one agent.

15. A computer-implemented method comprising:

obtaining a set of messages received by at least one agent, wherein each message of the set of messages is received from at least one other agent of a plurality of agents and includes a received content parameter that includes an instruction for the at least one agent;

categorizing each message of the set of messages into an asynchronous category comprising at least two asynchronous messages, or a synchronous category comprising at least one synchronous message;

determining a significance parameter indicative of an importance of the received content parameter, of each of the at least two asynchronous messages; and determining, for the at least one agent, a response signal related to a response strategy, the response signal determined based on the significance parameter each of the at least two asynchronous messages.

16. The computer-implemented method of claim 15, wherein each message of the set of messages further comprises a received identification parameter indicative of an identity of the at least one other agent, and the response signal is further based on the received identification parameter of the at least two asynchronous messages.

17. The computer-implemented method of claim 16, wherein each agent of the plurality of agents comprises, a local vector clock having a plurality of elements corresponding to a number of agents of the plurality of agents, each element of the plurality of elements comprising an event parameter indicative of one or more corresponding events related to a respective agent of the plurality of agents;

wherein each message of the set of messages further comprises a sent vector timestamp indicative of a second timepoint when the message was sent, the sent vector timestamp corresponding to the local vector clock of the respective one of the at least one other agent;

wherein the computer-implemented method further comprises:

comparing the sent vector timestamp of each message of the set of messages, with the local vector clock;

wherein categorizing each message of the set of messages, into the asynchronous category comprising the at least two asynchronous messages, or the synchronous category comprising the at least one synchronous message is further based on the comparison.

18. The computer-implemented method of claim 17, wherein comparing the sent vector timestamp of each message of the set of messages with the local vector clock includes:

comparing at least one element in the sent vector timestamp to a corresponding at least one element in the local vector clock of the at least one agent;

determining for each message of the set of messages, whether at least one element in the sent vector timestamp is less than a corresponding at least one element in the local vector clock of the at least one agent; and categorizing a message within the set of messages as an asynchronous messaged within the asynchronous category, if it is determined that the at least one element in the sent vector timestamp is less than the corresponding at least one element in the local vector clock of the at least one agent.

19. The computer-implemented method of claim 18, further comprising:

determining, for each message of the set of messages, whether the at least one element in the sent vector timestamp is equal to the corresponding at least one element in the local vector clock of the at least one agent; and categorizing another message of the set of messages as a synchronous message within the synchronous category, if it is determined that the at least one element in the sent vector timestamp is equal to the corresponding at least one element in the local vector clock of the at least one agent.

20. A non-transitory computer readable medium comprising instructions, which when executed by a processor, causes the processor to:

obtain a set of messages received by at least one agent of a plurality of agents, wherein each message of the set of messages is received from at least one other agent of the plurality of agents and includes a received content parameter indicative of an instruction for the at least one agent;

categorize each message of the set of messages into an asynchronous category comprising at least two asynchronous messages or a synchronous category comprising at least one synchronous message;

determine a significance parameter indicative of an importance of the received content parameter of each of the at least two asynchronous messages; and determine, for the at least one agent, a response signal related to a response strategy, the response signal determined based on the significance parameter of each of the at least two asynchronous messages.

\* \* \* \* \*